US012647921B2

(12) United States Patent
Salkintzis et al.

(10) Patent No.: US 12,647,921 B2
(45) Date of Patent: Jun. 2, 2026

(54) RECEIVING A SUBSCRIPTION FOR ACCESSING A LOCAL SERVER

(71) Applicant: Lenovo (Singapore) Pte. Ltd., New Tech Park (SG)

(72) Inventors: Apostolis Salkintzis, Athens (GR); Genadi Velev, Darmstadt (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 321 days.

(21) Appl. No.: 18/260,444

(22) PCT Filed: Jan. 5, 2021

(86) PCT No.: PCT/EP2021/050100
§ 371 (c)(1),
(2) Date: Jul. 5, 2023

(87) PCT Pub. No.: WO2022/148534
PCT Pub. Date: Jul. 14, 2022

(65) Prior Publication Data
US 2024/0064683 A1     Feb. 22, 2024

(51) Int. Cl.
*H04W 60/00*     (2009.01)

(52) U.S. Cl.
CPC ................................. *H04W 60/005* (2013.01)

(58) Field of Classification Search
CPC .... H04W 60/005; H04W 8/205; H04W 60/00
See application file for complete search history.

(56) References Cited

U.S. PATENT DOCUMENTS

| | | | | | |
|---|---|---|---|---|---|
| 9,794,769 | B2 * | 10/2017 | Dubesset | ................ | H04W 8/06 |
| 9,888,375 | B2 * | 2/2018 | Zisimopoulos | ......... | H04W 8/12 |
| 10,834,574 | B1 * | 11/2020 | Sikes | .................... | H04L 67/565 |
| 2010/0304716 | A1 * | 12/2010 | Hoeksel | ................ | H04W 12/06 |
| | | | | | 455/411 |

(Continued)

OTHER PUBLICATIONS

PCT/EP2021/050100, "Notification of Transmittal of the International Search Report and the Written Opinion of the International Searching Authority, or the Declaration", International Searching Authority, Nov. 25, 2021, pp. 1-30.

(Continued)

*Primary Examiner* — Santiago Garcia
(74) *Attorney, Agent, or Firm* — Kunzler Needham Hilton

(57) ABSTRACT

Apparatuses, methods, and systems are disclosed for provisioning a subscription to access local services. One apparatus includes a network interface that receives a first request message from an application function associated with a first service, the first request message containing a second subscription that enables a UE having a first subscription to register with a second mobile communication network that is not accessible with the first subscription. The apparatus includes a processor that receives an indication that the UE has initiated communication with a remote server accessible via the first mobile communication network and sends a second request message to the UE, the second request message containing the second subscription and enables the UE to access a local server via the second mobile communication network, where the local server provides the first service.

18 Claims, 13 Drawing Sheets

(56) References Cited

U.S. PATENT DOCUMENTS

| | | | | |
|---|---|---|---|---|
| 2012/0315875 | A1* | 12/2012 | Breuer | H04L 63/108 |
| | | | | 455/411 |
| 2013/0189985 | A1* | 7/2013 | Mutya | H04W 52/0254 |
| | | | | 455/436 |
| 2015/0011129 | A1* | 1/2015 | Xiao | H04B 1/3816 |
| | | | | 439/630 |
| 2017/0208070 | A1 | 7/2017 | Burns et al. | |
| 2018/0218619 | A1* | 8/2018 | Brown | G08G 5/727 |
| 2020/0084743 | A1* | 3/2020 | Fernandez Galmes | |
| | | | | H04W 60/04 |
| 2020/0137755 | A1* | 4/2020 | Lee | H04W 72/0453 |
| 2022/0264511 | A1* | 8/2022 | Lee | H04W 60/04 |
| 2022/0360395 | A1* | 11/2022 | Kim | H04W 56/0045 |
| 2022/0369097 | A1* | 11/2022 | Ioffe | H04W 8/183 |

OTHER PUBLICATIONS

Nokia et al., "KI #1: way forward proposal", SA WG2 Meeting #140E S2-2005731, Aug. 19-Sep. 2, 2020, pp. 1-5.

China Telecom, "KI #4, Sol #32: Update to clarify the trigger for provisioning procedure and remove ENs", SA WG2 Meeting #S2-140E e-meeting S2-2005955, Aug. 19-Sep. 2, 2020, pp. 1-6.

Nokia et al., "23.700-07: KI#4: Update on conclusions for component #2 (CP based provisioning)", 3GPP TSG-SA WG2 Meeting #142E e-meeting S2-2009157, Nov. 16-20, 2020, pp. 1-3.

3GPP, "3rd Generation Partnership Project; Technical Specification Group Services and System Aspects; Study on enhanced support of non-public networks (Release 17)", 3GPP TR 23.700-07 V0.3.0, Jan. 2020, pp. 1-42.

* cited by examiner

FIG. 3B

Network Equipment Apparatus
600

Processor
605

Memory
610

Input Device
615

Output Device
620

Transceiver 625

Transmitter
630

Receiver
635

Network Interface(s)
640

Application Interface(s)
645

700

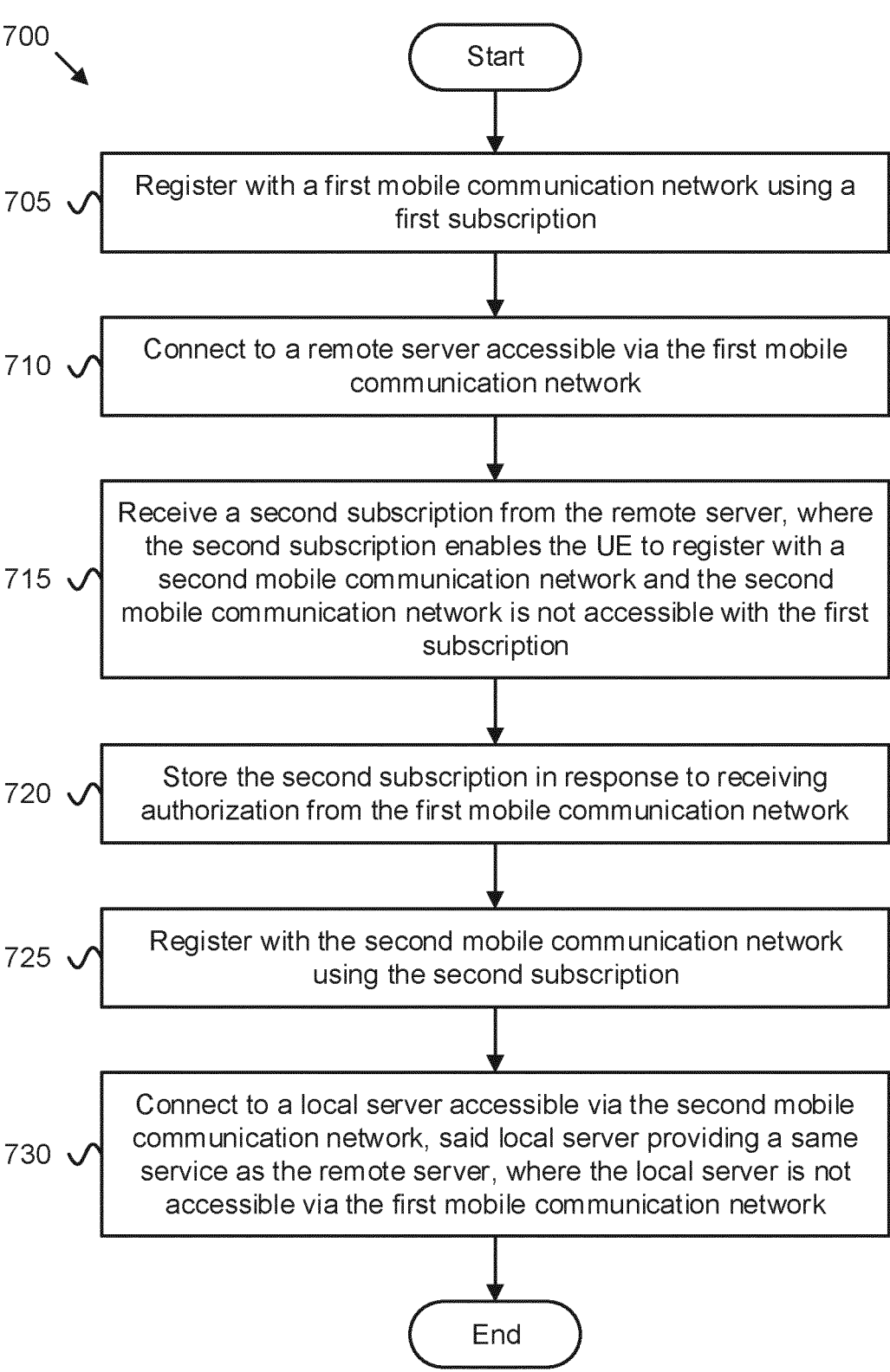

Start

705 — Register with a first mobile communication network using a first subscription 710 — Connect to a remote server accessible via the first mobile communication network 715 — Receive a second subscription from the remote server, where the second subscription enables the UE to register with a second mobile communication network and the second mobile communication network is not accessible with the first subscription 720 — Store the second subscription in response to receiving authorization from the first mobile communication network 725 — Register with the second mobile communication network using the second subscription 730 — Connect to a local server accessible via the second mobile communication network, said local server providing a same service as the remote server, where the local server is not accessible via the first mobile communication network End

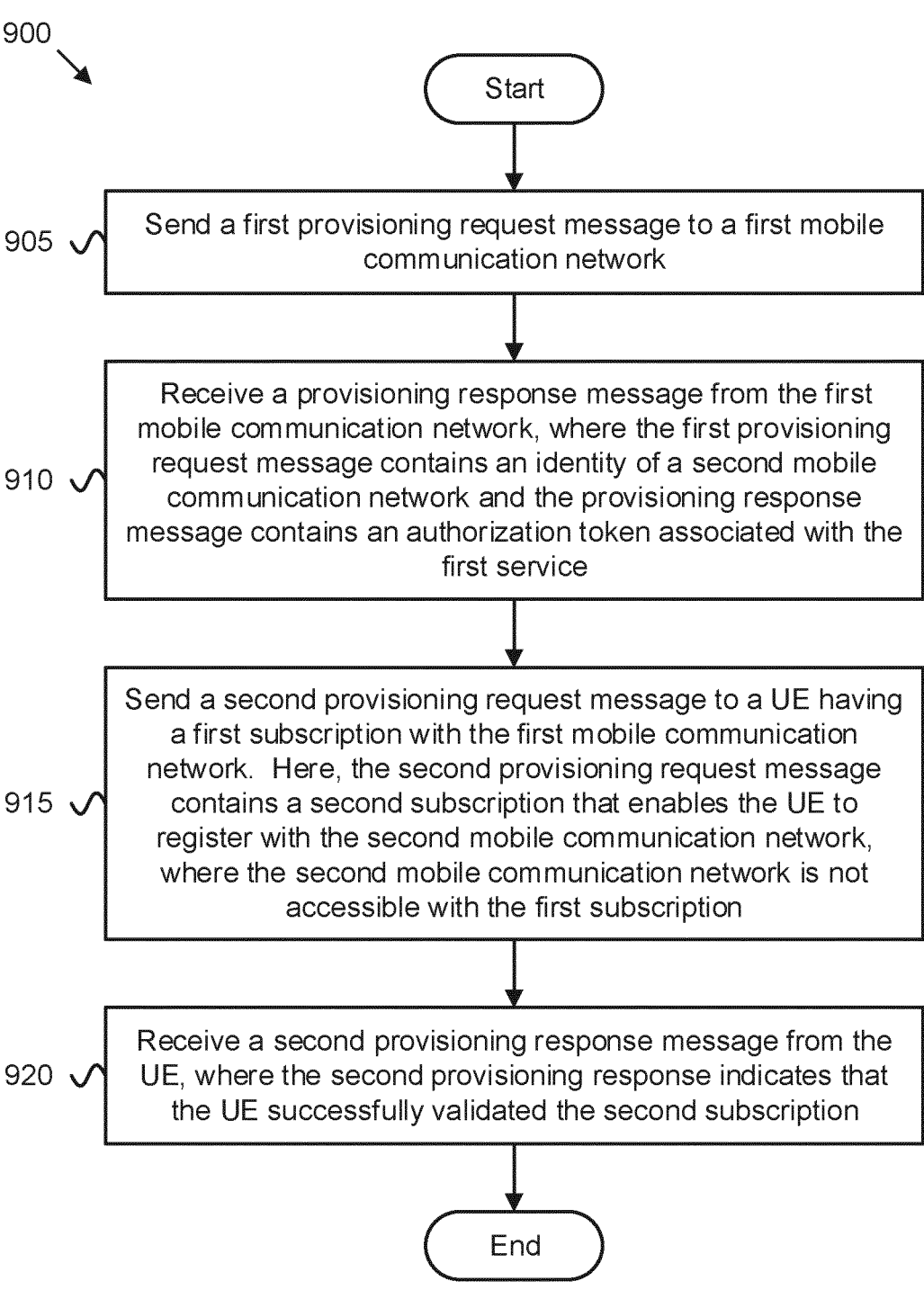

Start

905

Send a first provisioning request message to a first mobile communication network

910

Receive a provisioning response message from the first mobile communication network, where the first provisioning request message contains an identity of a second mobile communication network and the provisioning response message contains an authorization token associated with the first service

915

Send a second provisioning request message to a UE having a first subscription with the first mobile communication network. Here, the second provisioning request message contains a second subscription that enables the UE to register with the second mobile communication network, where the second mobile communication network is not accessible with the first subscription

920

Receive a second provisioning response message from the UE, where the second provisioning response indicates that the UE successfully validated the second subscription End

FIG. 9

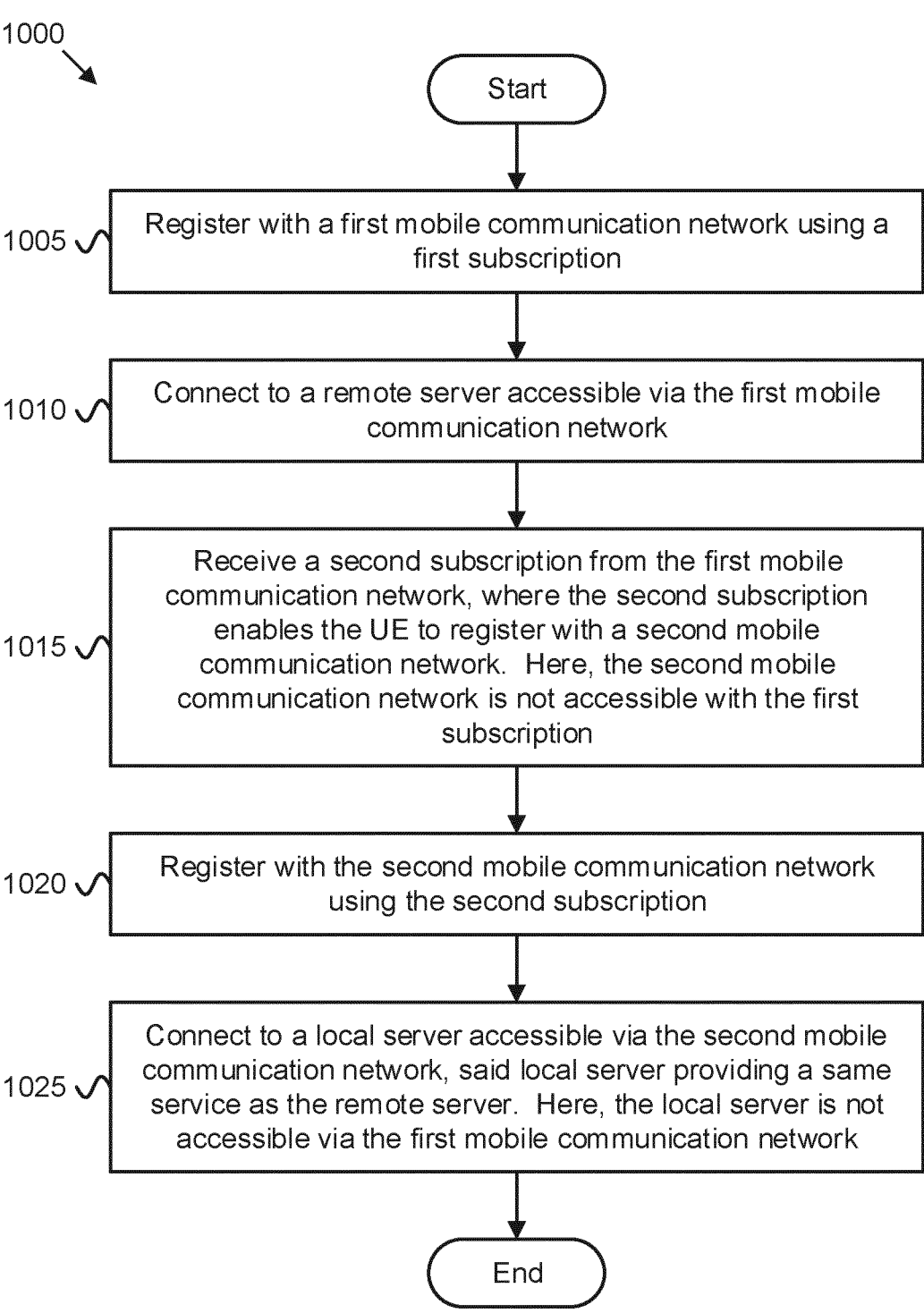

1000

Start

1005   Register with a first mobile communication network using a first subscription 1010   Connect to a remote server accessible via the first mobile communication network 1015   Receive a second subscription from the first mobile communication network, where the second subscription enables the UE to register with a second mobile communication network. Here, the second mobile communication network is not accessible with the first subscription 1020   Register with the second mobile communication network using the second subscription 1025   Connect to a local server accessible via the second mobile communication network, said local server providing a same service as the remote server. Here, the local server is not accessible via the first mobile communication network End

FIG. 10

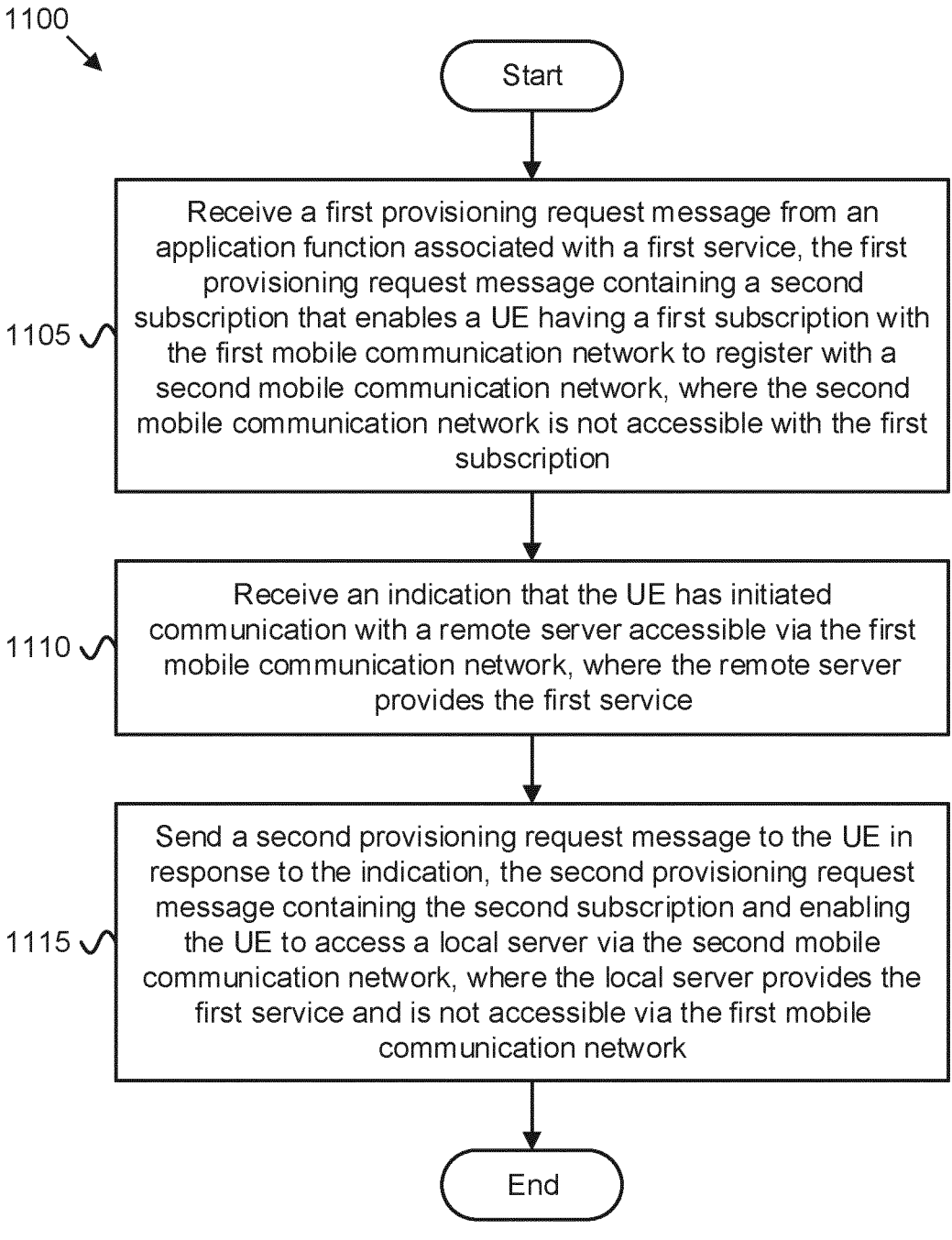

1100

Start

1105 Receive a first provisioning request message from an application function associated with a first service, the first provisioning request message containing a second subscription that enables a UE having a first subscription with the first mobile communication network to register with a second mobile communication network, where the second mobile communication network is not accessible with the first subscription 1110 Receive an indication that the UE has initiated communication with a remote server accessible via the first mobile communication network, where the remote server provides the first service 1115 Send a second provisioning request message to the UE in response to the indication, the second provisioning request message containing the second subscription and enabling the UE to access a local server via the second mobile communication network, where the local server provides the first service and is not accessible via the first mobile communication network End

FIG. 11

RECEIVING A SUBSCRIPTION FOR ACCESSING A LOCAL SERVER

The subject matter disclosed herein relates generally to provisioning a subscription to access local services in a mobile communication network.

BACKGROUND

The following abbreviations and acronyms are herewith defined, at least some of which are referred to within the following description.

Third Generation Partnership Project ("3GPP"), Fifth-Generation Core network ("5GC"), Access and Mobility Management Function ("AMF"), Access Point Name ("APN"), Access Stratum ("AS"), Access Network Information ("ANI"), Application Programing Interface ("API"), Authentication Server Function ("AUSF"), Data Network Name ("DNN"), Downlink ("DL"), Enhanced Mobile Broadband ("eMBB"), Evolved Node-B ("eNB"), Evolved Packet Core ("EPC"), Evolved UMTS Terrestrial Radio Access Network ("E-UTRAN"), Home Subscriber Server ("HSS"), International Mobile Subscriber Identity ("IMSI"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Country Code ("MCC"), Mobile Network Code ("MNC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Application Protocol ("NGAP"), Next Generation Radio Access Network ("NG-RAN"), Non-Public (aka Private) Network ("NPN"), New Radio ("NR"), Non-5G-capable-over-WLAN ("N5CW"), Policy Control Function ("PCF"), Packet Data Network ("PDN"), Packet Data Unit ("PDU"), PDN Gateway ("PGW"), Public Land Mobile Network ("PLMN"), PDU Session Anchor ("PSA"), Quality of Service ("QoS"), Radio Access Network ("RAN"), Radio Access Technology ("RAT"), Radio Resource Control ("RRC"), Receive ("Rx"), Security Mode Control ("SMC"), Single Network Slice Selection Assistance Information ("S-NSSAI"), Serving Gateway ("SGW"), Session Management Function ("SMF"), Standalone NPN ("SNPN"), Subscription Concealed Identifier ("SUCI"), Subscription Permanent Identifier ("SUPI"), Transmission Control Protocol ("TCP"), Transmit ("Tx"), Trusted Non-3GPP Access Network ("TNAN"), Trusted Non-3GPP Access Point ("TNAP"), Trusted Non-3GPP Gateway Function ("TNGF"), Unified Data Management ("UDM"), User Entity/Equipment (Mobile Terminal) ("UE"), Uplink ("UL"), User Plane ("UP"), Universal Mobile Telecommunications System ("UMTS"), User Datagram Protocol ("UDP"), User Location Information ("ULI"), Wireless Local Area Network ("WLAN"), and Worldwide Interoperability for Microwave Access ("WiMAX").

A network service can be deployed in several instances, each one in a different location. The network service instances deployed close to clients, which consume their services, are called Local Service Instances (or Edge service Instances), whereas the network service instances deployed far from clients are called Remote Service Instances.

A Remote Service Instance is typically deployed in a public IP network (e.g., the Internet), so it can be accessed from any client, as long as the client can connect to the public IP network via any access network. In contrast, a Local Service Instance is typically deployed inside an access network (e.g., PLMN or SNPN), so it can be accessed only from clients that can register with this access network.

BRIEF SUMMARY

One method of a first network function, e.g., an AMF, for provisioning a subscription to access local services includes receiving a registration request message from a remote unit (i.e., UE) and receiving a subscription retrieval information. Here, the registration request message contains an external subscriber identifier of the UE and the subscription retrieval information is different than the UE identifier. The method includes transmitting to a network function in a mobile communication network a first request for subscription data retrieval using the subscription retrieval information and receiving a response message from the network function that contains the UE subscription data. Here, the subscription retrieval information indicates that the subscription data is stored in a subscription owner outside the mobile communication network.

One method of a second network function, e.g., a TWIF, for provisioning a subscription to access local services includes receiving a registration request message from a remote unit (i.e., UE) and receiving a subscription retrieval information. Here, the registration request message contains an external subscriber identifier of the UE and the subscription retrieval information is different than the UE identifier. The method includes transmitting to a network function in a mobile communication network a first request for subscription data retrieval using the subscription retrieval information and receiving a response message from the network function that contains the UE subscription data. Here, the subscription retrieval information indicates that the subscription data is stored in a subscription owner outside the mobile communication network.

One method of a third network function, e.g., a UDM, for provisioning a subscription to access local services includes receiving from an AUSF in a mobile communication network a first request to provide authentication data for a remote unit, where the request indicates an authentication request type. The third method includes selecting a first authentication method using the authentication request type and subscription data of the remote unit and responding to the first request by sending an authentication vector, where the response also indicates the first authentication method.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 3B is a continuation of the procedure depicted in FIG. 3A;

FIG. 7 is a flow chart diagram illustrating one embodiment of a first method for provisioning a subscription to access local services;

FIG. 9 is a flow chart diagram illustrating one embodiment of a third method for provisioning a subscription to access local services;

FIG. 10 is a flow chart diagram illustrating one embodiment of a fourth method for provisioning a subscription to access local services; and FIG. 11 is a flow chart diagram illustrating one embodiment of a fifth method for provisioning a subscription to access local services.

DETAILED DESCRIPTION

Figure 1:
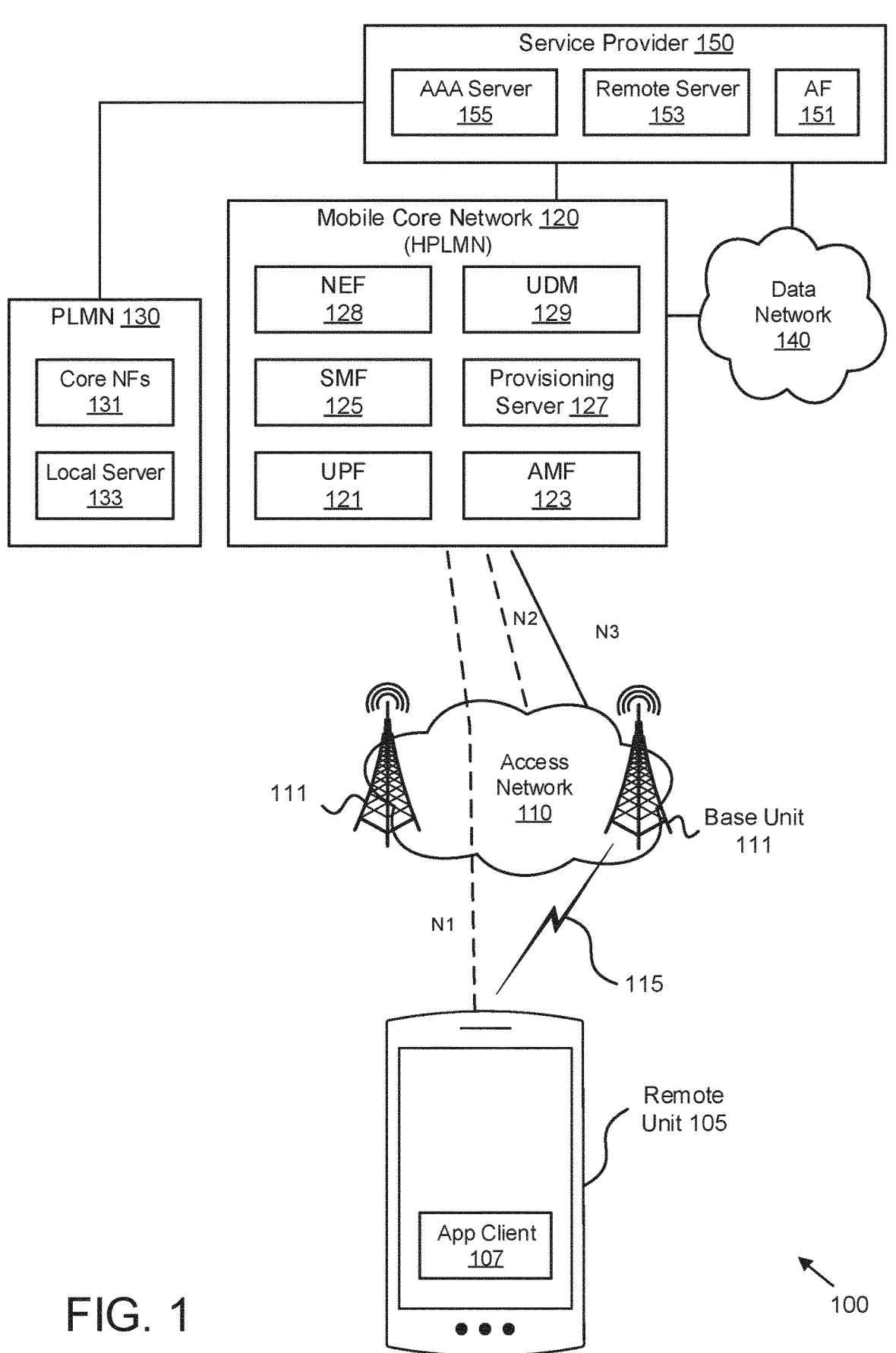
FIG. 1 is a diagram illustrating one embodiment of a wireless communication system for provisioning a subscription to access local services.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for provisioning a subscription to access local services. A network service can be deployed in several instances, each one in a different location. The network service instances deployed close to clients, which consume their services, are called Local Service Instances (or Edge service Instances), whereas the network service instances deployed far from clients are called Remote Service Instances.

A Remote Service Instance is typically deployed in a public IP network (e.g., the Internet), so it can be accessed from any client, as long as the client can connect to the public IP network via any access network. In contrast, a Local Service Instance is typically deployed inside an access network (e.g., PLMN or SNPN), so it can be accessed only from clients that can register with this access network.

The user-plane path between the UE and a Remote Service Instance is typically long and cannot guarantee very good communication quality, e.g., cannot guarantee very small latency and loss rate. In contrast, the user-plane path between the client in a UE and a Local Service Instance is typically short and it is possible to guarantee very good communication quality. Therefore, when the UE is near a Local Service Instance, it is preferable for the UE to access the Local Service Instance in order to experience better communication quality.

However, in many scenarios, this is not feasible due to limited deployment of Local Service Instances, e.g., local servers deployed in a PLMN for which a UE does not have a subscription. Consequently, although the UE can access the network service (since it can connect to a Remote Service Instance), the communication quality experienced by the UE for this network instance cannot be optimized.

Disclosed herein are solutions that enable a UE (a) to register with a mobile network (e.g., PLMN or SNPN) with which the UE does not have a subscription and cannot roam into, and (b) to access a local service (e.g., Local Service Instance) in this mobile network. As discussed in greater detail below, the subscription information needed for the UE to access this mobile network is provisioned to UE over-the-air, after receiving authorization from the HPLMN.

The main scenario enabled by this disclosure is summarized using the following example: A game company GC1 has deployed several game servers (i.e., Remote Service Instances) in the Internet. However, GC1 wants also to deploy game servers closer to mobile users (i.e., Local Service Instances), so that the gaming experience over mobile networks is improved.

GC1 makes an agreement with a mobile network operator MNO-B to deploy its game servers (i.e., local game servers) on the edge platform of this mobile network operator, in one or multiple locations. The agreement indicates that the local game servers in MNO-B's edge platform should be accessible by all game users of GC1, not only by the users who have subscription with MNO-B. As part of this agreement, MNO-B indicates to GC1 the PDU Session parameters (e.g., DNN, S-NSSAI, PDU Session Type, etc.) required to access the local game servers in MNO-B's edge platform. In addition, GC1 requests authorization from a mobile network operator MNO-A to provide subscription information to multiple (or all) subscribers of MNO-A, so that these subscribers can register with MNO-B in certain location areas.

Bob is a game user of GC1 and has a subscription with mobile network operator MNO-A. Bob decides to play a game and launches the client game app on his UE. The client game app discovers and connects to a remote game server of GC1 in the Internet. Due to the long distance between the UE and the remote game server of GC1, the communication experience may be degraded. The remote game server sends a new subscription to Bob's client game app, which contains information required to register with MNO-B and to access a local game server in MNO-B's edge platform. This subscription information contains access credentials and the PDU Session parameters indicated by MNO-B (in step 2).

The client game app installs the new subscription in Bob's UE. This requires the client game app to have some special privileges in the UE, or to receive authorization from MNO-B, i.e., from Bob's mobile operator. After installing the new subscription in Bob's UE and after determining that Bob's UE is located in an area where a local game server is available (based on the received subscription information), Bob's UE decides to activate the new subscription, i.e., to apply the subscription information to register with MNO-B.

The client game app is notified when the registration with MNO-B is completed and then requests a new PDU Session via MNO-B, using the PDU Session parameters contained in the subscription information. After the PDU session via MNO-B is established, the client game app discovers and connects to a local game server deployed in MNO-B's edge platform. After that, Bob enjoys his game with improved communication experience.

FIG. 1 depicts a wireless communication system 100 for provisioning a subscription to access local services, according to embodiments of the disclosure. In one embodiment, the wireless communication system 100 includes at least one remote unit 105, at least one access network ("AN") 110, and a mobile core network 120 in a PLMN (e.g., a HPLMN).

The AN 110 may be composed of at least one base unit 111. The remote unit 105 may communicate with the AN 110 using communication links 115, according to a radio access technology deployed by AN 110. Even though a specific number of remote units 105, base units 111, ANs 110, and mobile core networks 120 are depicted in FIG. 1, one of skill in the art will recognize that any number of remote units 105, base units 111, ANs 110, and mobile core networks 120 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as '4G') or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the base units 111 in the AN 110 via uplink ("UL") and downlink ("DL") communication signals. Furthermore, the UL and DL communication signals may be carried over the communication links 115. Note, that the AN 110 is an intermediate network that provide the remote units 105 with access to the mobile core network 120.

The base units 111 may serve a number of remote units 105 within a serving area, for example, a cell or a cell sector, via a communication link 113. The base units 111 may communicate directly with one or more of the remote units 105 via communication signals. Generally, the base units 111 transmit DL communication signals to serve the remote units 105 in the time, frequency, and/or spatial domain. Furthermore, the DL communication signals may be carried over the communication links 115. The communication links 115 may be any suitable carrier in licensed or unlicensed radio spectrum. The communication links 115 facilitate communication between one or more of the remote units 105 and/or one or more of the base units 111.

The base units 111 may be distributed over a geographic region. In certain embodiments, a base unit 111 may also be referred to as an access terminal, an access point, a base, a base station, a relay node, a device, or by any other terminology used in the art. The base units 111 are generally part of a radio access network ("RAN"), such as the AN 110, that may include one or more controllers communicably coupled to one or more corresponding base units 111. These and other elements of radio access network are not illustrated but are well known generally by those having ordinary skill in the art. The base units 111 connect to the mobile core network 120 via the AN 110.

In some embodiments, the remote units 105 communicate with an application server 151 and/or remote server 153 (or other communication peer) via a network connection with the mobile core network 120. For example, an application in a remote unit 105 (e.g., web browser, media client, telephone/VoIP application) may trigger the remote unit 105 to establish a PDU session (or other data connection) with the mobile core network 120 using the access network 110. The mobile core network 120 then relays traffic between the remote unit 105 and the communication peer (e.g., in the service provider network 150) using the PDU session.

The PDU session represents a logical connection between the remote unit 105 and the UPF 131. A UPF 141 which terminates a PDU session (e.g., of the remote unit 105) within the mobile core network 120 acts as a PDU Session Anchor ("PSA"). In order to establish the PDU session, the remote unit 105 must be registered with the mobile core network 120. Note that the remote unit 105 may establish one or more PDU sessions (or other data connections) with the mobile core network 120. As such, the remote unit 105 may have at least one PDU session for communicating with the service provider network 150. The remote unit 105 may establish additional PDU sessions for communicating with other data networks and/or other communication peers.

In one embodiment, the mobile core network 120 is a 5G core ("5GC") or the evolved packet core ("EPC"), which may be coupled to a data network (such as the Internet and private data networks, among other data networks). A remote unit 105 may have a subscription or other account with the mobile core network 120. The present disclosure is not intended to be limited to the implementation of any particular wireless communication system architecture or protocol.

The mobile core network 120 includes several network functions ("NFs"). As depicted, the mobile core network 120 includes at least one user plane function ("UPF") 121. The mobile core network 120 also includes multiple control plane functions including, but not limited to, an Access and Mobility Management Function ("AMF") 123, a Session Management Function ("SMF") 125, a provisioning server 127, and a Unified Data Management function ("UDM") 129. In certain embodiments, the mobile core network 120 may also include a Policy Control Function ("PCF"), an Authentication Server Function ("AUSF"), a Network Repository Function ("NRF") (used by the various NFs to discover and communicate with each other over APIs), or other NFs defined for the 5G Core.

In various embodiments, the mobile core network 120 supports different types of mobile data connections and different types of network slices, wherein each mobile data connection utilizes a specific network slice. Each network slice includes a set of CP and UP network functions, wherein each network slice is optimized for a specific type of service or traffic class. The different network slices are not shown in FIG. 1 for ease of illustration, but their support is assumed. In one example, each network slice instance includes an instance of the SMF 125 and the UPF 121, but the various network slices share the AMF 123, the PCF 127, and the UDM/UDR 129. In another example, each network slice instance includes an instance of the AMF 123, the SMF 125, and the UPF 121. Although specific numbers and types of network functions are depicted in FIG. 1, one of skill in the art will recognize that any number and type of network functions may be included in the mobile core network 120.

A network service can be deployed in several instances, each one in a different location. The network service instances deployed close to clients, which consume their services, are referred to as Local Service Instances (or Edge Service Instances), whereas the network service instances deployed far from clients are referred to as Remote Service Instances. In the depicted embodiment of FIG. 1, the PLMN 130 includes a local server 130 which is a Local Service Instance that corresponds to the Remote Server 153 found in the service provider domain 150. The PLMN 130 may also include additional core NFs 131, such as those described above with reference to the mobile core network 120.

A Remote Service Instance (e.g., Remote Sever 153) is typically deployed in a public IP network (e.g., the Internet), so it can be accessed from any client, as long as the client can connect to the public IP network via any access network. In contrast, a Local Service Instance (e.g., Local Server 133) is typically deployed inside an access network (e.g., PLMN or SNPN), so it can be accessed only from clients that can register with this access network.

However, in many scenarios, this is not feasible due to limited deployment of Local Service Instances, e.g., local servers deployed in a PLMN for which a UE does not have a subscription. For example, the UE shown in FIG. 1-1 can access only a Remote Service Instance because its Home PLMN (HPLMN) deploys no Local Service Instances. The Local Service Instances deployed in other PLMNs (e.g., PLMN-1 and PLMN-2) cannot be accessed by the UE because the UE has no subscriptions with these PLMNs. Consequently, although the UE can access the network service (since it can connect to a Remote Service Instance), the communication quality experienced by the UE for this network instance cannot be optimized.

The solutions described herein enable the remote unit 105 to both register with the PLMN 130—a mobile network with which the UE does not have a subscription and thus cannot roam into—and to access a local server 133 (e.g., Local Service Instance) in this mobile network. While FIG. 1 shows a PLMN 130, in other embodiments this mobile network may be a SNPN. As described below, the remote unit 105 may be provisioned with a new subscription, after the HPLMN (i.e., UDM 129 in the mobile core network 120) authorizes this provisioning. This new subscription is associated with the PLMN 130 and allows the remote unit 105 to access the local server 133, where the remote unit 105 cannot access the PLMN 130 using an existing subscription (e.g., the subscription used to access the mobile core network 120).

Figure 2:
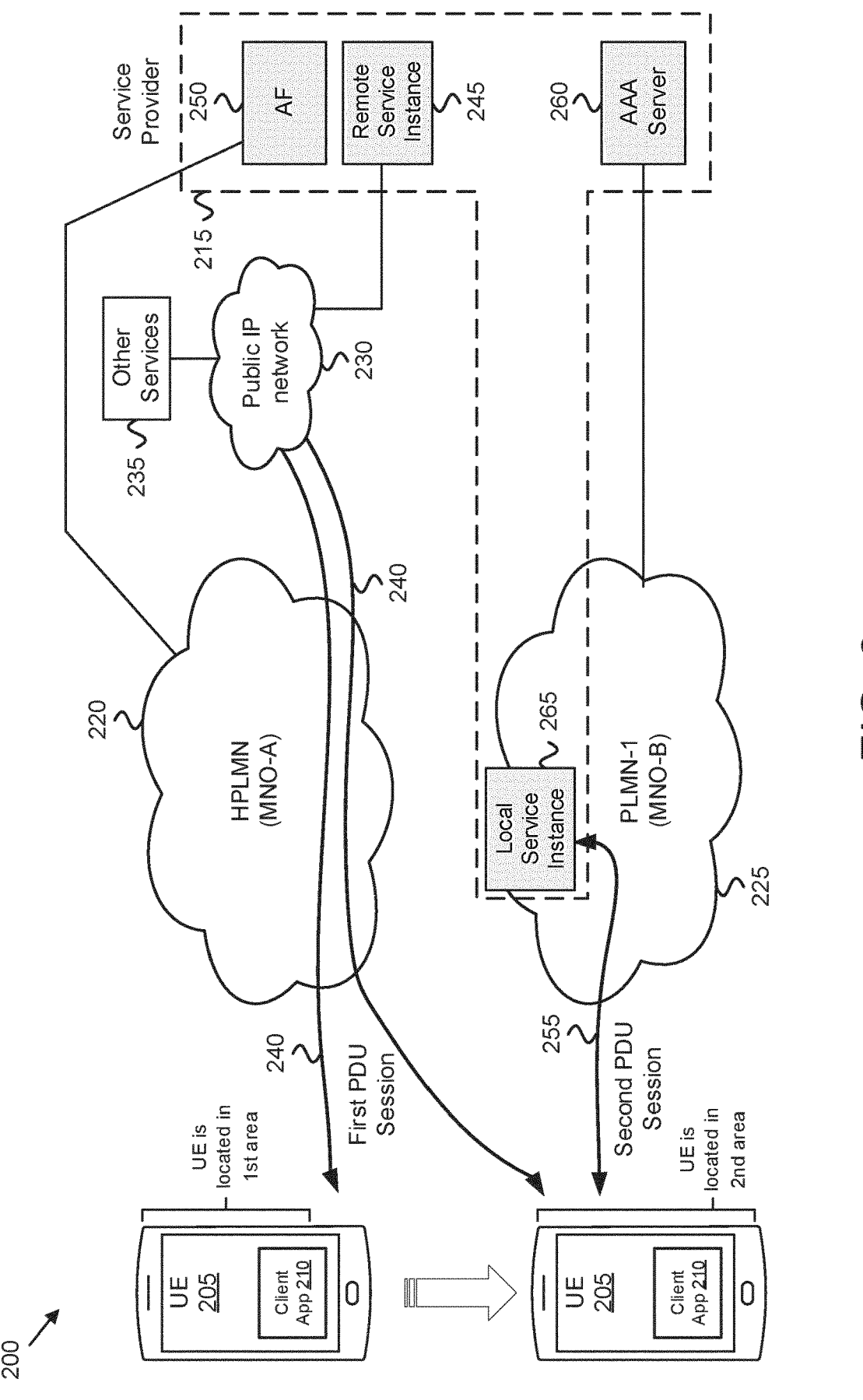
FIG. 2 is a diagram illustrating one embodiment of a network architecture for provisioning a subscription to access local services in a mobile communication network.

FIG. 2 depicts a network architecture for provisioning a subscription to access local services in a mobile communication network. The architecture 200 includes a UE 205 having a client application 210 for accessing a first service provided by the service provider 215. The architecture 200 includes a first network, i.e., HPLMN 220, and a second network (called PLMN-1 225). A public IP network 230 enables access to the service provider 215, as well as other services 235. Although FIG. 2 shows the second network being a PLMN, in alternative scenarios the second network can be a Standalone Non-Public Network ("SNPN"). Note that the first network and second network are operated by different mobile network operators ("MNO").

The UE 205 has a first subscription (e.g., stored in USIM) that enables the UE 205 to register with the HPLMN 220. The UE 205 registers with the HPLMN 220 and establishes a first PDU Session 240 with the HPLMN. The first PDU Session 240 enables the UE 205 to access the IP network 230 (e.g., the Internet) and several services accessible via this IP network 230, such as a game server, a video server, a chat server, etc. A service instance accessing via this IP network 230 is called the Remote Service Instance 245.

The UE 205 is provisioned over-the-air ("OTA") with a second subscription that enables the UE 205 to register with a second network 225 (e.g., PLMN or SNPN) and to access services locally deployed in the second network 225, wherein the second network 225 is not accessible with the first subscription in the UE 205. The provisioning of the second subscription in the UE 205 is authorized by the HPLMN 215. Note that the service provider domain 215 may include an application function ("AF") 250 that interacts with the HPLMN 215 to provision the second subscription, as described in detail below.

When the UE 205 moves to a location wherein the second subscription is valid, the UE 205 applies the second subscription to register with the second network 225 and to establish a second PDU Session 255 with the second network 225. During the registration procedure, the second network 225 allows primary authentication from the AAA server 260 in the Service Provider domain 215.

The UE 205 then accesses local services deployed in the second network (called Local Service Instances 265) via the second PDU Session 255. By accessing local service instances 265 deployed near the UE 205, instead of their remote service instance 245 counterparts deployed far from the UE 205, it becomes possible to offer better service experience to the end user.

Figure 3A:
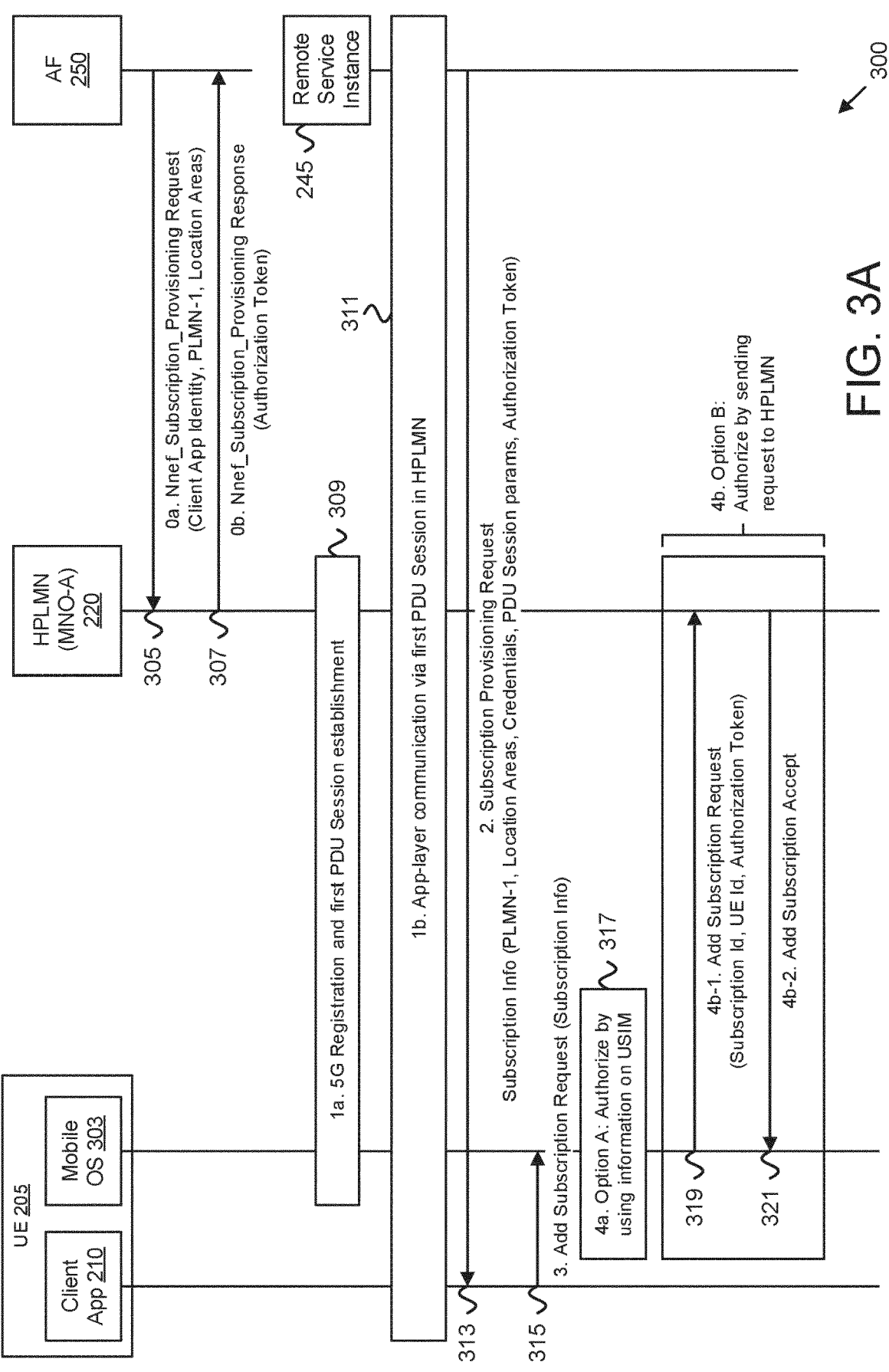
FIG. 3A is a diagram illustrating one embodiment of a procedure for provisioning a subscription to access local services in a mobile communication network.
Figure 3B:
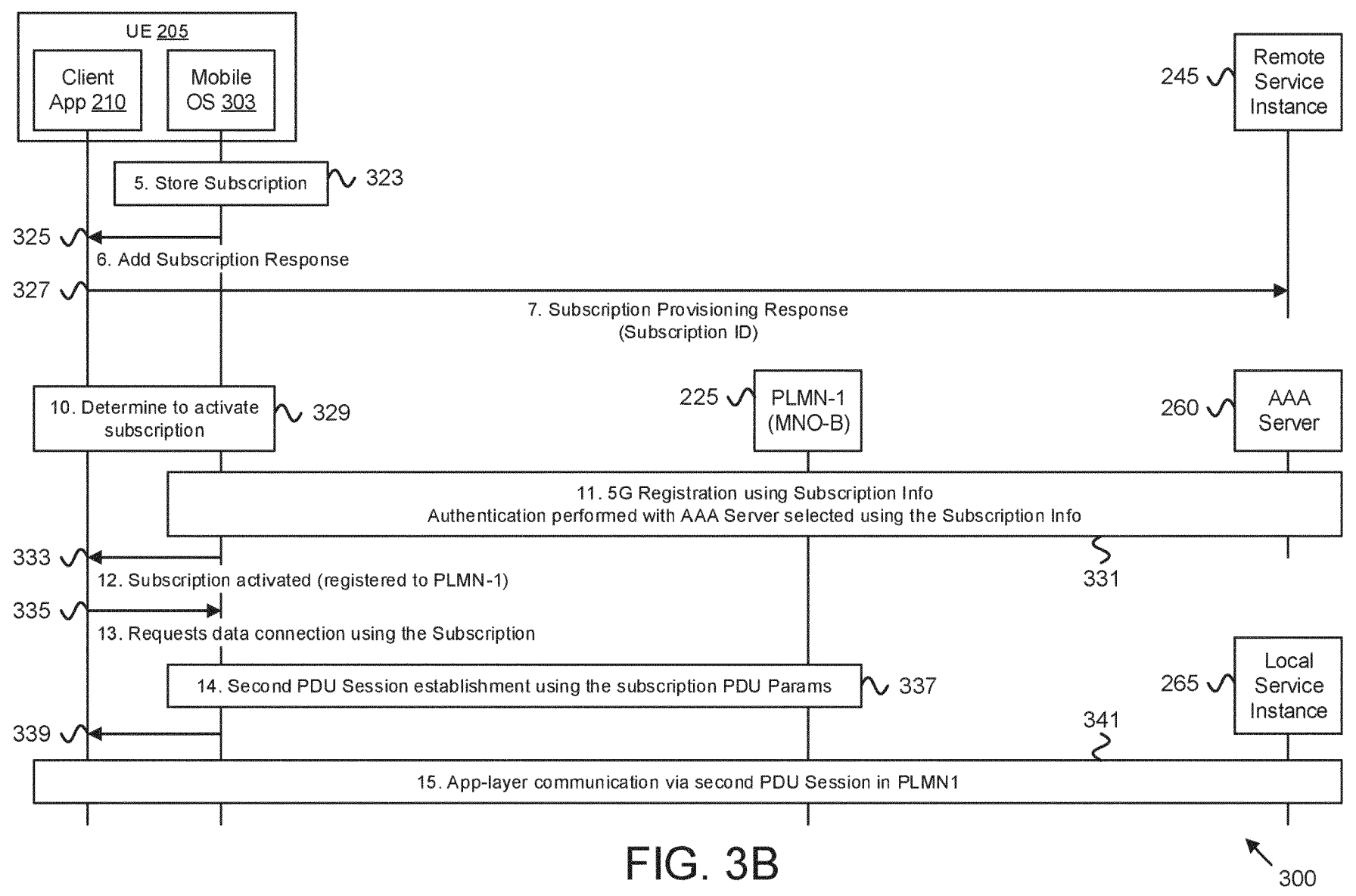

FIGS. 3A-3B depict a signaling flow of a procedure 300 for provisioning a subscription to access local services in a mobile communication network. The procedure 300 involves the UE 205, the HPLMN 220, the PLMN-1 225, the AF 250, the remote service instance 245, the AAA server 260, and the local service instance 265. Here, the HPLMN 220 is operated by a first MNO ("MNO-A") and the second network PLMN-1 225 is operated by a different MNO ("MNO-B"). The procedure 300 represents a first solution where the remote service instance 245 provisions the UE 205 with a second subscription usable to connect to a local service instance 265 located in a different network (i.e., in the PLMN-1 225). Although FIG. 3B shows a PLMN-1 225 as the second network, in alternative scenarios the second network operated by MNO-B may be a Standalone Non-Public Network ("SNPN").

Before the procedure 300 is executed, the Service Provider (e.g., Game Company "GC1", from the above example), which owns the Remote Service Instances 245 (e.g., remote game servers) and the Local Service Instances 265 (e.g., local game servers), has made an agreement with mobile network operator "MNO-B" to deploy one or more Local Service Instances 265, in one or multiple locations inside the mobile network (i.e., PLMN-1 225) operated by MNO-B. The agreement indicates that the Local Service Instances 265 in PLMN-1 225 should be accessible by all users of the Service Provider, not only by the users who have subscription with PLMN-1 225 or can roam into PLMN-1 225 (e.g., due to lack of roaming agreements). As part of this agreement, MNO-B indicates to the Service Provider the PDU Session parameters (e.g., DNN, S-NSSAI, PDU Session Type, etc.) required to access the Local Service Instances 265 in PLMN-1 225.

The procedure 300 begins at FIG. 3A, in Step 0*a* where, after the Service Provider makes the agreement with MNO-B and receives the PDU Session parameters from MNO-B, the Service Provider asks from MNO-A authorization to configure a plurality of MNO-A's subscribers with subscription information that enables these subscribers to register with MNO-B's network (PLMN-1) in certain locations. In order to receive this authorization, an AF 250 (such as the Remote Service Instance 245 or another application function owned by the Service Provider) sends an Nnef_Subscription_Provisioning Request to HPLMN containing the identity of the client application 210 which should be allowed to access local services in PLMN-1, the identity of PLMN-1, and the location areas in which the access to local services in PLMN-1 is needed (see messaging 305).

In Step 0*b*, if the HPLMN 220 authorizes this request, then the HPLMN 220 sends back an Nnef_Subscription_Provisioning Response containing an Authorization Token, i.e., a unique token associated with the granted authorization (see messaging 307). The use of this Authorization Token is further explained below. Note that Step 0 may be repeated for additional PLMNs (e.g., PLMN-2, PLMN-3, etc.) in case the AF 250 wants to enable the subscribers of HPLMN 220 to access Local Service Instances 265 deployed in additional PLMNs.

At Step 1*a*, the UE 205 (e.g., after powering up) registers with the HPLMN 220 and establishes a first PDU Session (e.g., the PDU session 240) using the procedures specified in 3GPP specifications (see block 309). In a typical scenario, the first PDU Session provides connectivity to a public IP network, e.g., the Internet.

At Step 1*b*, using the first PDU Session, the client application 210 in the UE 205 establishes secure communication with the Remote Service Instance 245 (e.g., a remote server), which is accessible via the public IP network (see block 311). As noted before, the user-plane path between the UE 205 and the Remote Service Instance 245 is typically long and may not provide very good communication quality (e.g., cannot guarantee very small latency and loss rate). For this reason, it is preferable for the client application 210 to communicate with a Local Service Instance 265, when available. The secure communication between the UE 205 and the Remote Service Instance 245 may be accomplished via known security mechanisms (e.g., TLS/SSL).

At Step 2, in order to enable the client application 210 in the UE 205 to communicate with a Local Service Instance 265 deployed in another PLMN (i.e., the PLMN-1 225) and experience better communication quality, the Remote Server Instance 245 sends a Subscription Provisioning Request message to the client application 210 (see messaging 313). The purpose of this message is to configure a new mobile network subscription in the UE 205, which will enable the UE 205 to connect with PLMN-1 225 and access the Local Service Instances 265 deployed in PLMN-1 225. Note that the UE 205 has only one subscription (in USIM), which enables the UE 205 to access the HPLMN 220. However, this subscription cannot be used to access PLMN-1 225, e.g., because there is no roaming agreement between HPLMN 220 and PLMN-1 225.

The Subscription Provisioning Request message on Step 2 contains subscription information for PLMN-1, for example one or more of:

The identity of the PLMN-1 225 (e.g., MNC and MCC values).

The credentials needed to register with the PLMN-1 225, for example, a username, a password and an authentication method, e.g., EAP-TTLS.

The location areas (e.g., geographical areas) in which Local Service Instances 265 are available in PLMN-1 225. These are the location areas where the subscription is valid.

The PDU Session parameters that can be used to establish a PDU Session in the PLMN-1 225 and access the Local Service Instances 265. These PDU Session parameters are typically defined by MNO-B and are communicated to the Service Provider when they setup their agreement.

The Authorization Token provided by HPLMN 220 in step 0*b* may also be included, which indicates that the HPLMN 220 has granted a first authorization (in step 0) for using subscriptions to PLMN-1 225. Note, however, that this first authorization is a general authorization, not associated with a specific UE or UEs.

At Step 3, the client application 210 in the UE 205 requests from the mobile OS 303 to add a new subscription to the list of the existing subscriptions in the UE 205 (see messaging 315). The existing subscriptions in the UE 205 include the subscription to HPLMN 220 and possibly subscriptions to additional PLMNs, in case the UE 205 has multiple USIMs. In an Android UE, the client application 210 in this step sends a request to the Subscription Manager to add a new subscription and provides the information for this new subscription.

At Step 4, before the mobile OS 303 accepts and installs the new subscription in the UE 205, it should confirm that the HPLMN 220 authorizes this subscription to be used by this UE 205. Hence, a second authorization by HPLMN 220 is required. This second authorization can be granted in one of the following methods:

At Step 4*a*, the UE 205 checks whether the client application 210 is an application trusted by HPLMN 220, i.e., whether the client application 210 is signed by a certificate that is already stored in the USIM (see block 317). If the client application 210 is a trusted application, then the request in Step 3 is accepted and the new subscription is added in the mobile OS 303.

At Step 4*b*, if the client application 210 is not an application trusted by HPLMN 220 (which is typically the most common case), then the UE 205 requests the HPLMN 220 to authorize the installation of the subscription in the UE 205.

At Step 4*b*-1, the mobile OS 303 sends an Add Subscription Request message to the HPLMN 220 (e.g., to a Subscription Management Function or another suitable network function in the HPLMN 220; see messaging 319). The UE 205 assigns a Subscription Identity ("Subscription ID") to this second subscription. The Add Subscription Request message contains the Subscription ID assigned by the UE 205 to identify this subscription, the UE identity (e.g., SUPI) and the Authorization Token, which is used by HPLMN 220 to find more details about the requested subscription.

At Step 4*b*-2, if the HPLMN 220 authorizes this particular UE 205 to use the requested subscription, then the HPLMN 220 responds with an Add Subscription Accepted message (see messaging 321). The Subscription ID provided by the UE 205 may be stored in the HPLMN 220 so that it may later request the UE 205 to delete this subscription, if needed.

Continuing on FIG. 3B, at Step 5, after the HPLMN 220 authorizes this particular UE 205 to use the requested subscription, the UE 205 installs/stores this subscription in the UE 205 (e.g., in the USIM; see block 323).

At Step 6, the mobile OS 303 responds to the client application 210 that the requested subscription has been added.

At Step 7, the client application 210 responds to the Remote Service Instance 245 that the requested subscription has been installed in the UE 205 and indicates the Subscription ID assigned by the UE 205 to identify this subscription (see messaging 327). This Subscription ID may be stored in the Remote Service Instance 245 so that it may later request the UE 205 to delete this subscription, if needed.

The following steps describe how the new subscription installed in the UE 205 can be applied in order for the client application 210 in the UE 205 to communicate with a Local Service Instance 265 accessible via PLMN-1 225.

At Step 10, the UE 205 (either the client application 210 itself, or the mobile OS 303) determines that the new subscription may be activated, e.g., because the UE 205 has entered one of the location areas where this second subscription is valid (see block 329). In a typical example, the client application 210 determines that the UE 205 has entered one of the location areas where this second subscription is valid, and requests from the underlying mobile OS 303 to activate this subscription, i.e., to discover and register with PLMN-1 225.

At Step 11, after PLMN-1 225 is discovered (e.g., after receiving the broadcast transmissions of PLMN-1 225 with sufficient signal quality), the UE 205 initiates a 5G registration procedure towards PLMN-1 225 and requests the Service Provider's AAA Server to perform a primary authentication with the UE 205 (see block 331). The UE 205 authenticates with the AAA Server 260 of the Service Provider (via PLMN-1 225) by using the subscription credentials received in step 2, e.g., by using EAP-TTLS authentication and a username/password pair.

Note that during this step and after successful registration with PLMN-1 225, if the UE 205 is not capable to communicate simultaneously with HPLMN 220 and PLMN-1 225, then the communication with HPLMN 220 may temporarily be suspended.

At Step 12, the mobile OS 303 notifies the client application 210 when the subscription has been activated, i.e., when the 5G registration with PLMN-1 225 has been completed (see messaging 333).

At Step 13, if the client application 210 wants to access a Local Service Instance 265 in PLMN-1 225, the client application 210 requests from mobile OS 303 to establish a second data connection using the activated subscription, i.e., to establish a second PDU Session with PLMN-1 225 using the PDU Session parameters in the activated subscription (see messaging 335).

At Step 14, the UE 205 establishes the second PDU Session with PLMN-1 225 (see block 337) and notifies the client application 210 (see messaging 339).

At Step 15, the client application 210 uses the second PDU Session to discover a Local Service Instance 265 (e.g., to discover the IP address of a local game server in PLMN-1 225) and then initiates communication with this Local Service Instance 265 (see block 341). As a consequence, the user can enjoy a far better communication quality when interacting with the client application 210 due to the much short path between the UE 205 and the Local Service Instance 265.

Figure 4A:
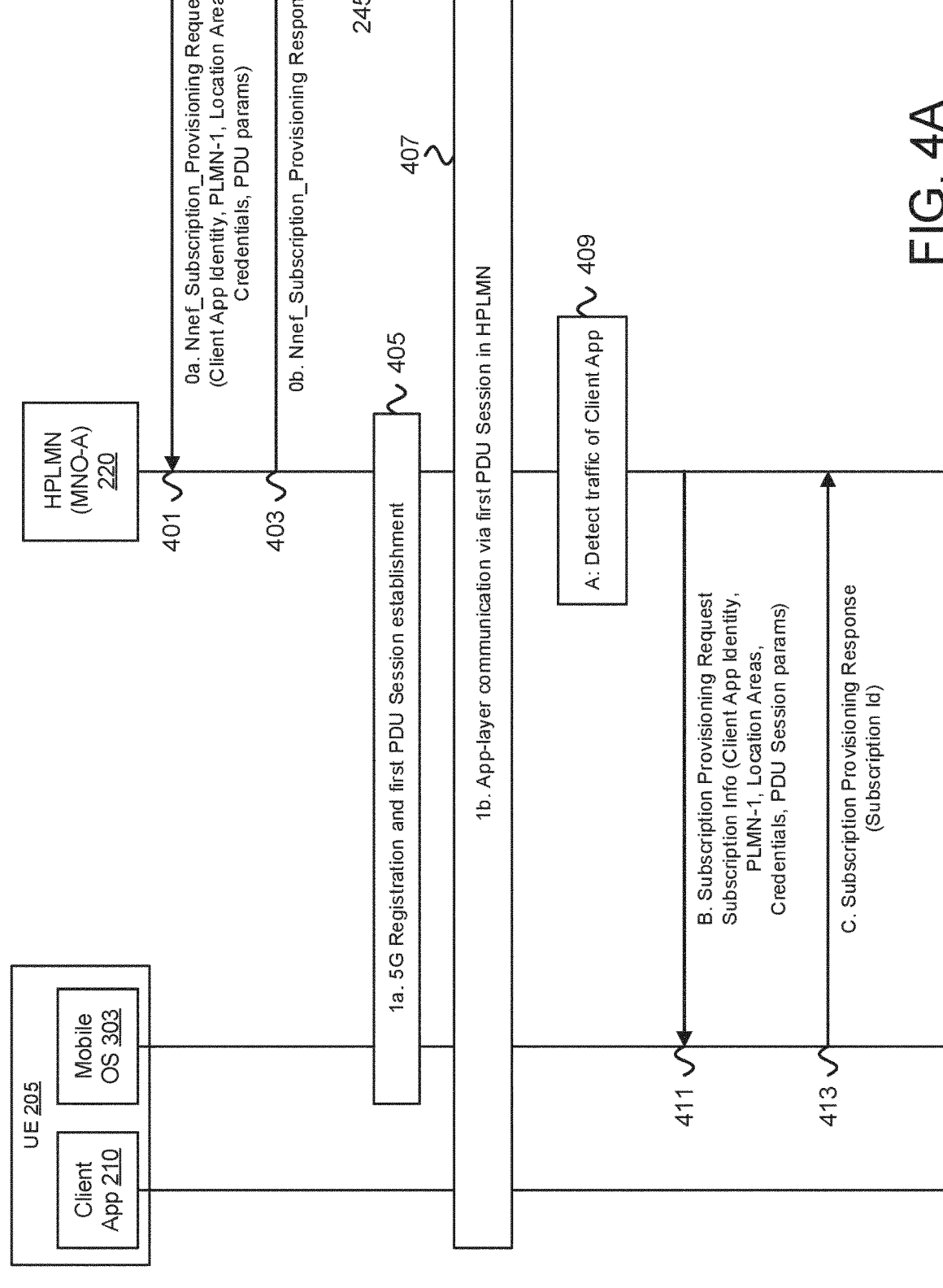
FIG. 4A is a diagram illustrating another embodiment of a procedure for provisioning a subscription to access local services in a mobile communication network.
Figure 4B:
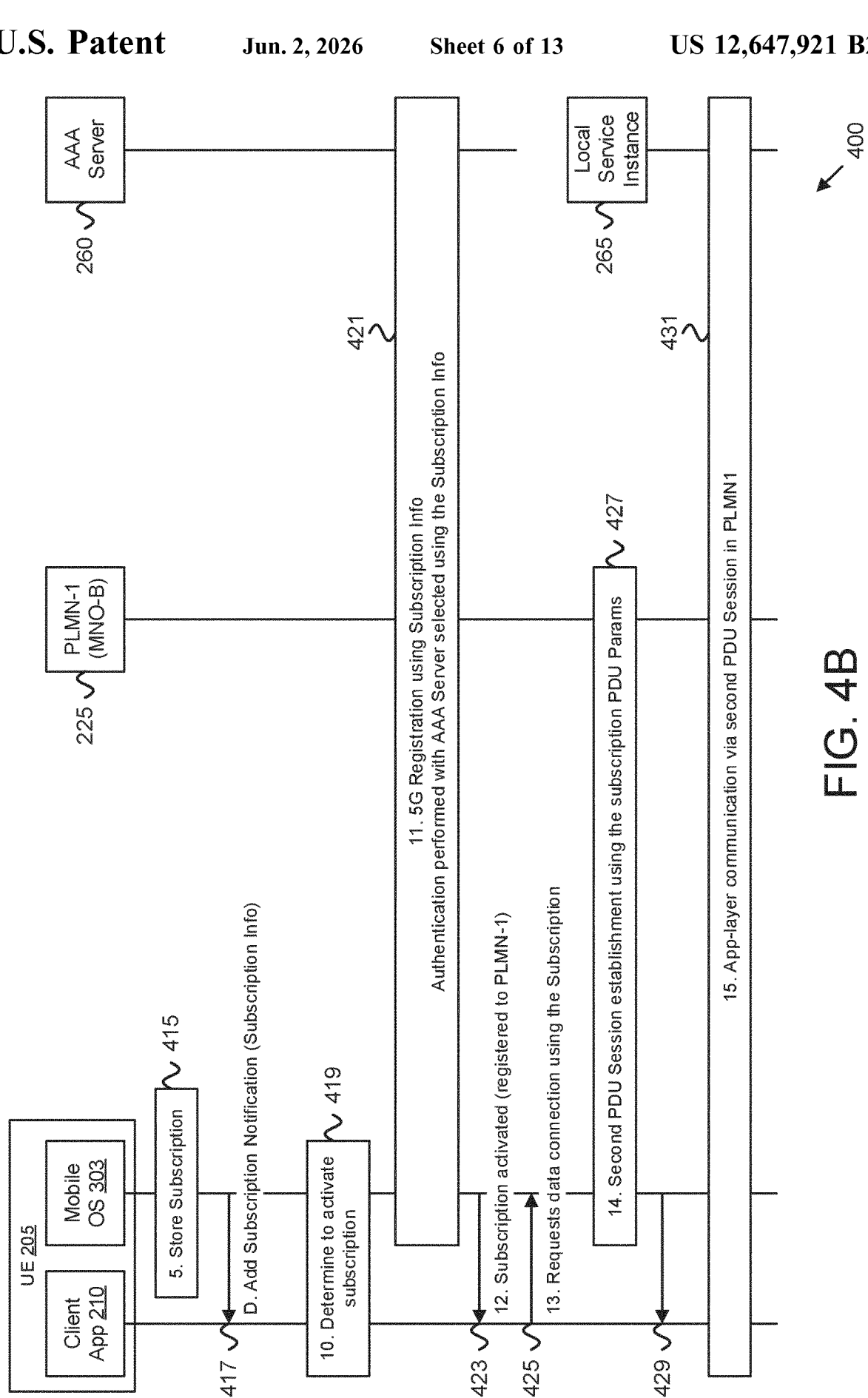
FIG. 4B is a continuation of the procedure depicted in FIG. 4A.

FIGS. 4A-4B depict a signaling flow of a procedure 400 for provisioning a subscription to access local services in a mobile communication network. The procedure 300 involves the UE 205, the HPLMN 220, the PLMN-1 225, the AF 250, the remote service instance 245, the AAA server 260, and the local service instance 265. Again, the HPLMN 220 is operated by a first MNO ("MNO-A") and the second network PLMN-1 225 is operated by a different MNO ("MNO-B"). The procedure 300 represents a second solution where a provisioning server in the HPLMN 220 provisions the UE 205 with a second subscription usable to connect to a local service instance 265 located in a different network (i.e., in the PLMN-1 225). Although FIG. 4B shows a PLMN-1 225 as the second network, in alternative scenarios the second network operated by MNO-B may be a Standalone Non-Public Network ("SNPN").

It is assumed that the Service Provider which owns the Remote Service Instances 245 and the Local Service Instances 265 has made an agreement with mobile network operator "MNO-B" to deploy one or more Local Service Instances 265, in one or multiple locations inside the mobile network (i.e., PLMN-1 225) operated by MNO-B. It is also assumed that the agreement indicates that the Local Service Instances 265 in PLMN-1 225 should be accessible by all users of the Service Provider, not only by the users who have subscription with PLMN-1 225 or can roam into PLMN-1 225 (e.g., due to lack of roaming agreements). As part of this agreement, MNO-B indicates to the Service Provider the PDU Session parameters (e.g., DNN, S-NSSAI, PDU Session Type, etc.) required to access the Local Service Instances 265 in PLMN-1 225.

The procedure 400 begins at FIG. 4A, in Step 0a where, after the Service Provider makes the agreement with MNO-B and receives the PDU Session parameters from MNO-B, the Service Provider provides provisioning information to MNO-A to configure a plurality of MNO-A's subscribers with subscription information that enables these subscribers to register with MNO-B's network (PLMN-1) in certain locations. In order to communicate this information, an AF 250 (such as the Remote Service Instance 245 or another application function owned by the Service Provider) sends an Nnef_Subscription_Provisioning Request to HPLMN containing the identity of the client application 210 which should be allowed to access local services in PLMN-1 225, the identity of PLMN-1 225 (e.g., MNC/MCC), the location areas in which the access to local services in PLMN-1 is needed, one or more Credentials needed to register with PLMN-1 225 (i.e., the credentials needed for authentication with AAA Server 260), and the PDU Session parameters needed for establishing a PDU Session in PLMN-1 225 (see messaging 405).

In Step 0b, if the HPLMN 220 authorizes this request, then the HPLMN 220 sends back an Nnef_Subscription_ Provisioning Response (see messaging 407). Note that no Authorization Token is required in the second solution because the UE 205 is provisioned by the HPLMN 220. Note that Step 0 may be repeated for additional PLMNs (e.g., PLMN-2, PLMN-3, etc.) in case the AF 250 wants to enable the subscribers of HPLMN 220 to access Local Service Instances 265 deployed in additional PLMNs.

While FIG. 4A shows a scenario where the AF 250 provides the subscription information to the HPLMN by 220 using the services exposed by the NEF in the HPLMN 220. However, in another scenario, the AF 250 may use the services exposed by the Operations, Administration and Maintenance ("OAM") platform in the HPLMN 220. In yet another scenario, the subscription information may be manually provisioned in the HPLMN 220, without the need for signaling exchange between the AF 250 and the HPLMN 220.

At Step 1*a*, the UE 205 (e.g., after powering up) registers with the HPLMN 220 and establishes a first PDU Session (e.g., the PDU session 240) using the procedures specified in 3GPP specifications (see block 309). Here, it is assumed that the subscription, which enables the UE 205 to access the HPLMN 220 cannot be used to access PLMN-1 225, e.g., because there is no roaming agreement between HPLMN 220 and PLMN-1 225.

At Step 1*b*, using the first PDU Session, the client application 210 in the UE 205 establishes secure communication with the Remote Service Instance 245 (e.g., a remote server), which is accessible via the public IP network (see block 311). The secure communication between the UE 205 and the Remote Service Instance 245 may be accomplished via known security mechanisms (e.g., TLS/SSL).

At Step A, the HPLMN 220 needs to identify the UEs which are subject to provisioning with a second subscription. Note that this subscription is to be provisioned only to UEs in the HPLMN 220 which attempt to use the client application 210. Provisioning this subscription to all UEs in the HPLMN 220, independent of whether they use the client application or not, is not very efficient.

The HPLMN 220 detects a condition that triggers the HPLMN 220 to provision the subscription authorized in the step 0 in a particular UE 205. For example, this condition could be detecting that a client application in the UE 205 has started communication with the Remote Service Instance 245 (see block 409). Because of the detected traffic, this UE 205 is to be provisioned with a new subscription so that the UE 205 can register with the PLMN-1 220 and access a Local Service Instance 265 in the PLMN-1 220.

According to the current 3GPP specifications, when the HPLMN 220 detects that a client application 210 in a UE 205 has started communication with the Remote Service Instance 245, the HPLMN 220 may insert a local UPF/PSA to the first PDU Session, which enables the UE 205 to connect to Local Service Instances 265 deployed in HPLMN 220. However, in the scenario considered in FIGS. 4A-4B there are no Local Service Instances 265 deployed in HPLMN 220. The Local Service Instances 265 are deployed in a different PLMN (i.e., PLMN-1 225) which is accessible with a separate subscription.

At Step B, after detecting the condition in the previous step, the HPLMN 220 (e.g., a provisioning server in the HPLMN 220) sends a Subscription Provisioning Request message to the UE 205, which contains all necessary subscription information (see messaging 411). Note that the Subscription Provisioning Request message is not received by a specific app in the UE 205, but it is rather received by a trusted component in the mobile OS 303 (e.g., a Subscription Manager or a Subscription Controller). The purpose of this message is to configure a new mobile network subscription in the UE 205, which will enable the UE 205 to connect with PLMN-1 225 and access the Local Service Instances 265 deployed in PLMN-1 225.

The Subscription Provisioning Request message contains subscription information for PLMN-1 225, for example one or more of:

The identity of the client application 210.
The identity of the PLMN-1 225 (e.g., MNC and MCC values).

The location areas (e.g., geographical areas) in which Local Service Instances 265 are available in PLMN-1 225. These are the location areas where the subscription is valid.

The credentials needed to register with the PLMN-1 225, for example, a username, a password and an authentication method, e.g., EAP-TTLS.

The PDU Session parameters that can be used to establish a PDU Session in the PLMN-1 225 and access the Local Service Instances 265. These PDU Session parameters are typically defined by MNO-B and are communicated to the Service Provider when they setup their agreement.

At Step C, the mobile OS 303 in the UE 205 sends to the HPLMN 220 a Subscription Provisioning Response message acknowledging the reception of the new subscription and also provides a Subscription Identity ("Subscription ID") to the HPLMN 220 so that the HPLMN 220 may later request the UE 205 to delete this subscription, if needed.

Continuing on FIG. 4B, at Step 5, the mobile OS 303 in the UE 205 accepts and stores this subscription in the UE 205 (e.g., in the USIM; see block 323).

At Step D, the mobile OS 303 in the UE 205 notifies one or more applications about the addition of a new subscription (see messaging 417). These applications (which include the client application 210) are applications which have registered their interests to receive such types of notifications.

The following steps describe how the new subscription installed in the UE 205 can be applied in order for the client application 210 in the UE 205 to communicate with a Local Service Instance 265 accessible via PLMN-1 225.

At Step 10, the UE 205 (either the client application 210 itself, or the mobile OS 303) determines that the new subscription may be activated, e.g., because the UE 205 has entered one of the location areas where this second subscription is valid (see block 419).

At Step 11, after PLMN-1 225 is discovered, the UE 205 initiates a 5G registration procedure towards PLMN-1 225 and requests the Service Provider's AAA Server to perform a primary authentication with the UE 205 (see block 421). The UE 205 authenticates with the AAA Server 260 of the Service Provider (via PLMN-1 225) by using the subscription credentials received in Step B, e.g., by using EAP-TTLS authentication and a username/password pair.

Again, during this step and after successful registration with PLMN-1 225, if the UE 205 is not capable to communicate simultaneously with HPLMN 220 and PLMN-1 225, then the communication with HPLMN 220 may temporarily be suspended.

At Step 12, the mobile OS 303 notifies the client application 210 when the subscription has been activated, i.e., when the 5G registration with PLMN-1 225 has been completed (see messaging 423).

At Step 13, if the client application 210 wants to access a Local Service Instance 265 in PLMN-1 225, the client application 210 requests from mobile OS 303 to establish a second data connection using the activated subscription (see messaging 425).

At Step 14, the UE 205 establishes the second PDU Session with PLMN-1 225 (see block 427) and notifies the client application 210 (see messaging 429).

At Step 15, the client application 210 uses the second PDU Session to discover a Local Service Instance 265 (e.g., to discover the IP address of a local game server in PLMN-1 225) and then initiates communication with this Local Service Instance 265 (see block 431).

Figure 5:
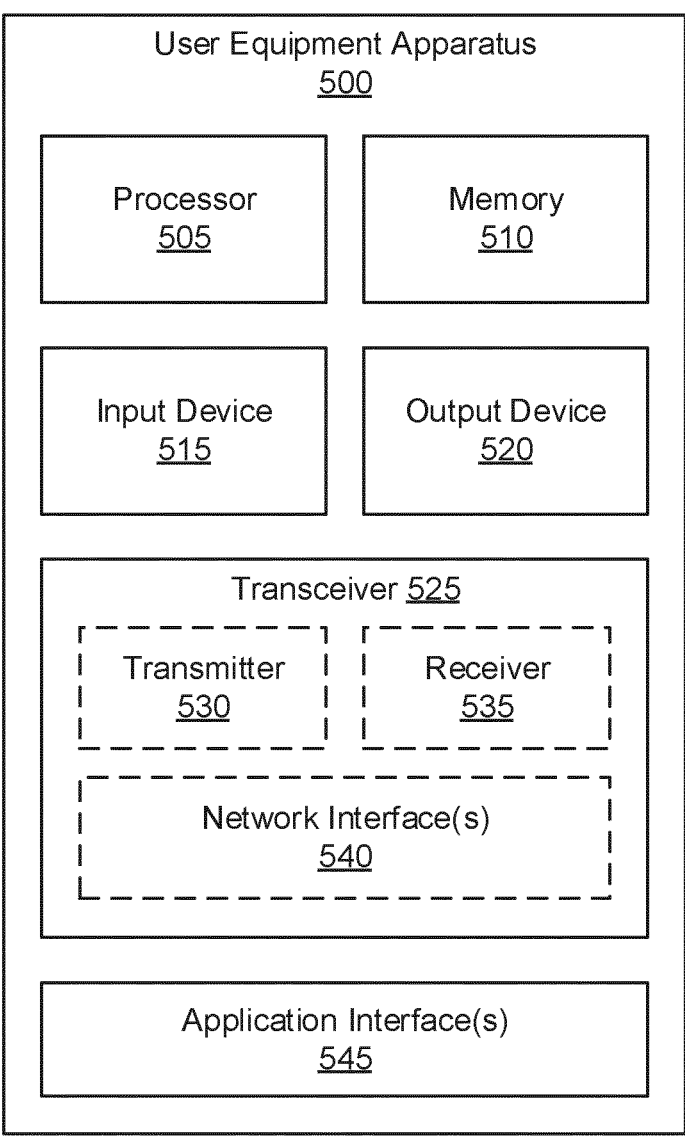
FIG. 5 is a block diagram illustrating one embodiment of a user equipment apparatus that supports provisioning a subscription to access local services.

FIG. 5 depicts one embodiment of a user equipment apparatus 500, according to embodiments of the disclosure. The user equipment apparatus 500 may be one embodiment of the remote unit 105 and/or the UE 205. Furthermore, the user equipment apparatus 500 may include a processor 505, a memory 510, an input device 515, an output device 520, a transceiver 525. In some embodiments, the input device 515 and the output device 520 are combined into a single device, such as a touch screen. In certain embodiments, the user equipment apparatus 500 does not include any input device 515 and/or output device 520.

As depicted, the transceiver 525 includes at least one transmitter 530 and at least one receiver 535. Here, the transceiver 525 communicates with a mobile core network (e.g., a 5GC) via an access network. Additionally, the transceiver 525 may support at least one network interface 540, such as the N1, N2, and N3 interfaces depicted in FIG. 1. In some embodiments, the transceiver 525 supports a first interface for communicating with a RAN node, a second interface for communicating with one or more network functions in a mobile core network (e.g., a 6GC) and a third interface for communicating with a remote unit (e.g., UE).

The user equipment apparatus 500 supports one or more application interfaces 545. Each application interface 545 supports communication among application instances running on the user equipment apparatus 500 and/or supports communication with an external application instance, e.g., running on a network device or a UE. In some embodiments, the application interface(s) 545 include a set of functions and procedures that allow for applications running on the user equipment apparatus 500 to access data and features of other applications, services, or operating systems. For example, an application client running on the user equipment apparatus 500 may use an application interface 545 to communicate with a corresponding application server.

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. According to the first solution, the processor 505 registers with the first mobile communication network using a first subscription (e.g., stored in USIM). The processor 505 connects to a remote server accessible via the first mobile communication network. Via the transceiver 525, the processor 505 receives a second subscription from the remote server, where the second subscription enables the user equipment apparatus 500 to register with a second mobile communication network (e.g., a PLMN). Note that the second mobile communication network is not accessible with the first subscription.

The processor 505 stores the second subscription (e.g., in the USIM) in response to receiving authorization from the first mobile communication network. Further, the processor 505 registers with the second mobile communication network using the second subscription. Via the transceiver 525, the processor 505 connects to a local server accessible via the second mobile communication network, said local server providing a same service as the remote server. Note that the local server is not accessible via the first mobile communication network.

In some embodiments, the processor 505 receives the second subscription via a first mobile application. In such embodiments, receiving authorization from the first mobile communication network includes the processor 505 verifying that the first mobile application is signed by a certificate stored in a subscriber identity module (e.g., USIM) of the user equipment apparatus 500.

In some embodiments, the processor 505 receives the second subscription in a subscription provisioning request message. In such embodiments, the processor 505 sends a subscription provisioning response message to the remote server, where the subscription provisioning response indicates whether the second subscription is successfully stored in the user equipment apparatus 500. In certain embodiments, the processor 505 further generates a subscription identity in response to successfully storing the second subscription. In such embodiments, the processor 505 includes the generated subscription identity in the subscription provisioning response message.

In some embodiments, the processor 505 receives authorization from the first mobile communication network by: 1) sending a subscription request message to the first mobile communication network and 2) receiving a subscription accept message from the first mobile communication network. Here, the subscription accept message authorizes the user equipment apparatus 500 to use the second subscription. In certain embodiments, the processor 505 receives an authorization token from the remote server and includes the authorization token in the subscription request message. Here, the subscription accept message is provided after validating the authorization token.

In some embodiments, the processor 505 registers with the second mobile communication network occurs in response to the user equipment apparatus 500 moving to a location area where the second subscription is valid. In some embodiments, registering with the second mobile communication network includes executing an authentication procedure between the user equipment apparatus 500 and an authentication server accessible via the second mobile communication network. In such embodiments, the authentication procedure uses a credential contained in the second subscription.

In some embodiments, connecting to the local server accessible via the second mobile communication network includes establishing a PDU session with the second mobile communication network using PDU session parameters contained in the second subscription. In some embodiments, the second subscription contains one or more of: an identity of the second mobile communication network, at least one location area where the second subscription is valid, a credential needed to register with the second mobile communication network, PDU session parameters, and/or an authorization token provided by the first mobile communication network.

According to the second solution, the processor 505 registers with a first mobile communication network using a first subscription (e.g., in USIM) and connects to a remote server accessible via the first mobile communication network. Via the transceiver, the processor 505 receives a second subscription from the first mobile communication network, where the second subscription enables the user equipment apparatus 500 to register with a second mobile communication network (e.g., a PLMN). Here, the second mobile communication network is not accessible with the first subscription. The processor 505 registers with the second mobile communication network using the second subscription. Via the transceiver 525, the processor 505 connects to a local server accessible via the second mobile communication network, said local server providing a same service as the remote server. Here, the local server is not accessible via the first mobile communication network.

In some embodiments, the processor 505 registers with the second mobile communication network occurs in response to moving to the location area where the second subscription is valid. In some embodiments, registering with the second mobile communication network includes executing an authentication procedure between the user equipment apparatus 500 and an authentication server accessible via the second mobile communication network. Here, the authentication procedure uses a credential contained in the second subscription.

In some embodiments, the second subscription is received with a subscription provisioning request message. In such embodiments, the processor generates a subscription identity in response to receiving the subscription provisioning request message and sends a subscription provisioning response message, where the subscription provisioning response message contains the generated subscription identity. Additionally, the processor may store the second subscription (e.g., in the USIM).

In some embodiments, the processor 505 connects to the local server accessible via the second mobile communication network by establishing a PDU session with the second mobile communication network using PDU session parameters contained in the second subscription. In some embodiments, the second subscription contains one or more of: an identity of a mobile application associated with the remote service, an identity of the second mobile communication network, at least one location area where the second subscription is valid, a credential needed to register with the second mobile communication network, and PDU session parameters.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 includes a subscriber identity module, such as a USIM. In some embodiments, the memory 510 stores data relating to provisioning a subscription to access local services, for example storing authentication parameters, security keys, device/entity identifiers, IP addresses, and the like. In certain embodiments, the memory 510 also stores program code and related data, such as an operating system ("OS") or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
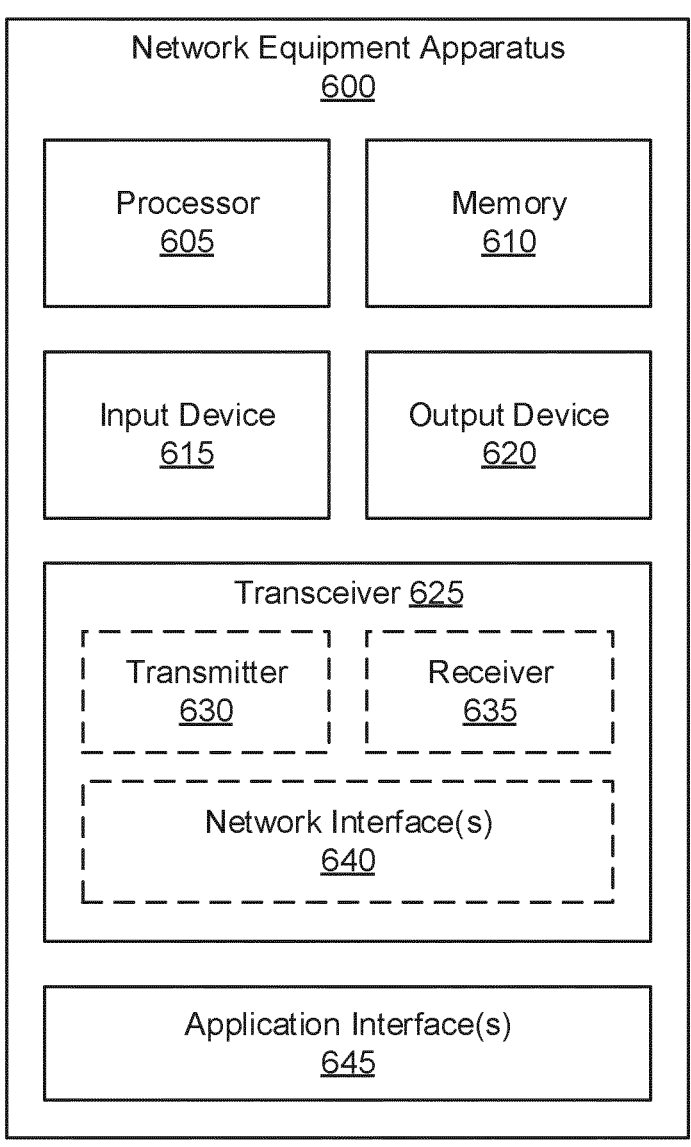
FIG. 6 is a block diagram illustrating one embodiment of a network equipment apparatus that supports provisioning a subscription to access local services.

FIG. 6 depicts one embodiment of a network equipment apparatus 600, according to embodiments of the disclosure. In some embodiments, the network equipment apparatus 600 may be one embodiment of a provisioning function in a HMPLN, such as the provisioning server 126 and/or HPLMN 215. In other embodiments, the network equipment apparatus 600 may be one embodiment of an application function and/or remote server that provides a first service, such as the AF 151, the remote server 153, the AF 230, and/or the remote service instance 235. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 65. Additionally, the transceiver 625 may support at least one network interface 640, such as the N1, N2, and N3 interfaces depicted in FIG. 1. In some embodiments, the transceiver 625 supports a first interface for communicating with one or more network functions in a mobile core network (e.g., a 5GC) and a second interface for communicating with an application server at a service provider.

The network equipment apparatus 600 supports one or more application interfaces 645. Each application interface 645 supports communication among application instances running on the user equipment apparatus 600 and/or supports communication with an external application instance, e.g., running on a network device or a UE. In some embodiments, the application interface(s) 645 include a set of functions and procedures that allow for applications running on the network equipment apparatus 600 to access data and features of other applications, services, or operating systems. As described above, an application server running on the network equipment apparatus 600 may use an application interface 645 to communicate with a client application running on a UE.

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the first transceiver 625.

In various embodiments, the processor 605 controls the network equipment apparatus 600 to implement the above described HPLMN and/or provisioning server behaviors. According to the first solution, the network interface 640 receives a provisioning request message from an application function associated with a first service, where the provisioning request message contains a second subscription that enables a UE having a first subscription with a first mobile communication network (i.e., the HPLMN) to register with a second mobile communication network. Here, the second mobile communication network is not accessible with the first subscription. The processor 605 sends a provisioning response message to the application function, where the provisioning response message contains an indication that the second subscription is accepted.

The processor 605 receives a subscription request message from the UE, the subscription request message containing a request to apply the second subscription. Via the network interface 640, the processor 605 sends a subscription accept message to the UE in response to validating the subscription request, where the subscription accept message authorizes the UE to apply the second subscription and enables the UE to access a local server via the second mobile communication network. Here, the local server provides the first service and is not accessible via the first mobile communication system.

In some embodiments, the indication contained in the provisioning response message comprises an authorization token. In such embodiments, the subscription request message contains the authorization token, where the subscription accept message is sent to the UE in response to validating the authorization token. Note that the authorization token is a token generated by the HPLMN to identify the second subscription. In certain embodiments, the authorization token is (or contains) a subscription identifier.

In some embodiments, the subscription request includes a UE identity and a subscription identity generated by the UE and associated with the second subscription. In such embodiments, the processor 605 stores the UE identity and the subscription identity. In some embodiments, the processor 605 sends a request to the UE via the network interface 640, where the request instructs the UE to delete the second subscription.

According to the second solution, the network interface 640 receives a first provisioning request message from an application function associated with a first service, the first provisioning request message containing a second subscription that enables a UE having a first subscription with the first mobile communication network (i.e., HPLMN) to register with a second mobile communication network. Here, the second mobile communication network is not accessible with the first subscription. The processor 605 receives an indication that the UE has initiated communication with a remote server accessible via the first mobile communication network, where the remote server provides the first service. Via the network interface 640 and in response to the indication, the processor 605 sends a second provisioning request message to the UE, where the second provisioning request message contains the second subscription and enables the UE to access a local server via the second mobile communication network, where the local server provides the first service and is not accessible via the first mobile communication network.

In some embodiments, the processor 605 receives a provisioning response message from the UE, where the provisioning response includes a subscription identity generated by the UE and associated with the second subscription. In such embodiments, the processor 605 stores a UE identity and the subscription identity. In some embodiments, the processor 605 sends a request to the UE, the request instructing the UE to delete the second subscription.

In various embodiments, the processor 605 controls the network equipment apparatus 600 to implement the above described AF and/or Remote Server transceiver 625. Via the network interface 640, the processor 605 sends a first provisioning request message to a first mobile communication network and receives a provisioning response message from the first mobile communication network. Here, the first provisioning request message contains an identity of a second mobile communication network and the provisioning response message contains an authorization token associated with the first service. The processor 605 sends a second provisioning request message to a UE having a first subscription with the first mobile communication network. Here, the second provisioning request message contains a second subscription that enables the UE to register with the second mobile communication network, where the second mobile communication network is not accessible with the first subscription. Via the network interface 640, the processor 605 receives a second provisioning response message from the UE, where the second provisioning response indicates that the UE successfully validated the second subscription.

In some embodiments, the second provisioning response message comprises a subscription identity generated by the UE and associated with the first service. In such embodiments, the processor 605 stores a UE identity and the subscription identity. In some embodiments, the first provisioning request message contains a client application identity. In such embodiments, the second provisioning request message is sent to a client application of the UE that matches the client application identity, where the second provisioning response message is received from the matching client application of the UE.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to provisioning a subscription to access local services, for example storing security keys, IP addresses, UE contexts, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 120). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

FIG. 7 depicts one embodiment of a method 700 for provisioning a subscription to access local services, according to embodiments of the disclosure. In various embodiments, the method 700 is performed by a UE, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and registers 705 with a first mobile communication network using a first subscription. The method 700 includes connecting 710 to a remote server accessible via the first mobile communication network. The method 700 includes receiving 715 a second subscription from the remote server, where the second subscription enables the UE to register with a second mobile communication network. Here, the second mobile communication network is not accessible with the first subscription. The method 700 includes storing 720 the second subscription in response to receiving authorization from the first mobile communication network. The method 700 includes registering 725 with the second mobile communication network using the second subscription. The method 700 includes connecting 730 to a local server accessible via the second mobile communication network, said local server providing a same service as the remote server. Here, the local server is not accessible via the first mobile communication network. The method 700 ends.

Figure 8:
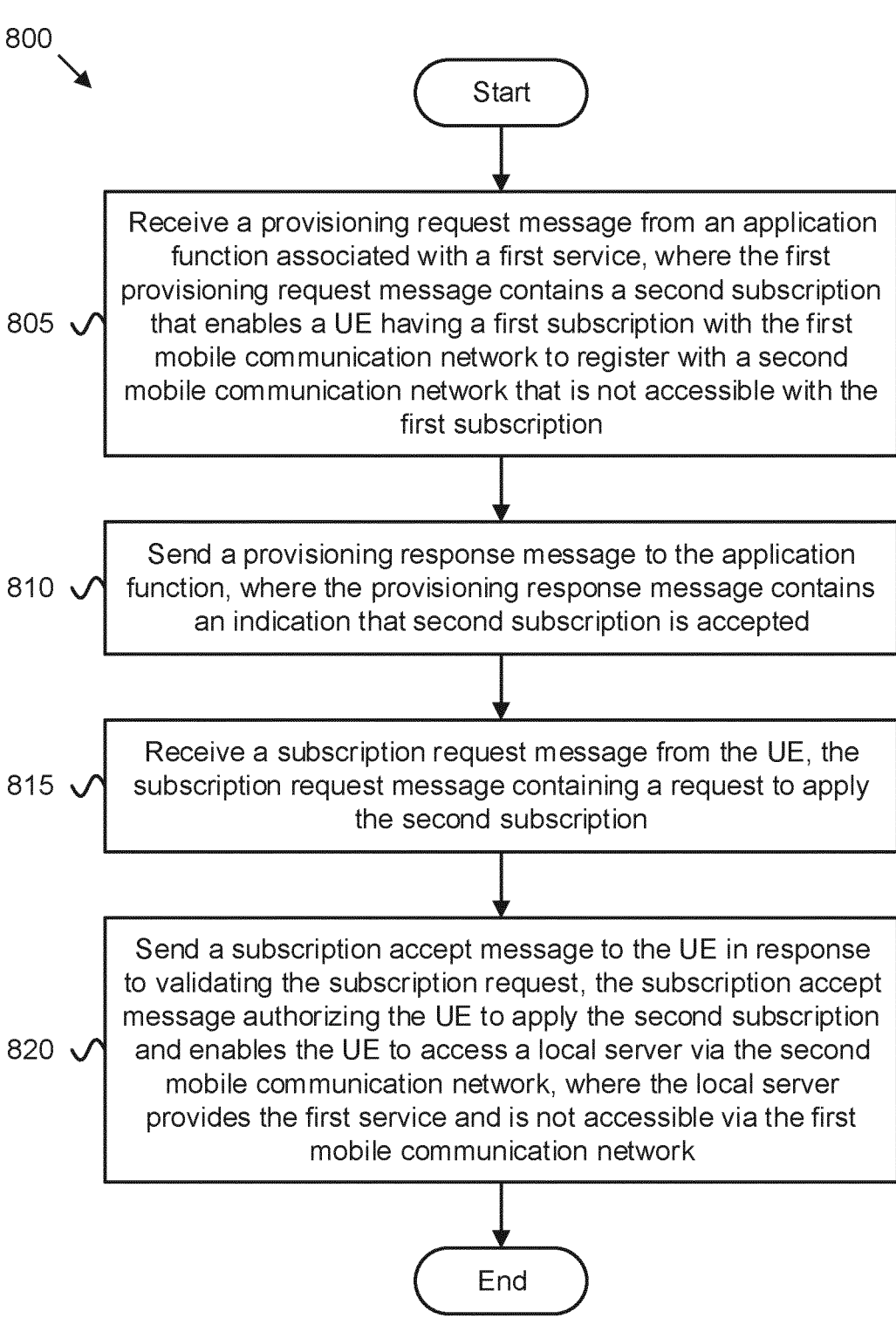
FIG. 8 is a flow chart diagram illustrating one embodiment of a second method for provisioning a subscription to access local services.

FIG. 8 depicts one embodiment of a method 800 for provisioning a subscription to access local services, according to embodiments of the disclosure. In various embodiments, the method 800 is performed by a HPLMN NF, such as the provisioning server 126, the HPLMN 215, and/or the network equipment apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 a provisioning request message from an application function associated with a first service, where the first provisioning request message contains a second subscription that enables a UE having a first subscription with the first mobile communication network to register with a second mobile communication network. Here, the second mobile communication network is not accessible with the first subscription. The method 800 includes sending 810 a provisioning response message to the application function, where the provisioning response message contains an indication that the second subscription is accepted.

The method 800 includes receiving 815 a subscription request message from the UE, the subscription request message containing a request to apply the second subscription. The method 800 includes sending 820 a subscription accept message to the UE in response to validating the subscription request, where the subscription accept message authorizes the UE to apply the second subscription and enables the UE to access a local server via the second mobile communication network. Here, the local server provides the first service and is not accessible via the first mobile communication network. The method 800 ends.

FIG. 9 depicts one embodiment of a method 900 for provisioning a subscription to access local services, according to embodiments of the disclosure. In various embodiments, the method 900 is performed by an application function and/or remote server that provides a first service, such as the AF 151, the remote server 153, the AF 230, the Remote Service Instance 235, and/or the network equipment apparatus 600, described above. In some embodiments, the method 900 is performed by a processor, such as a microcontroller, a microprocessor, a CPU, a GPU, an auxiliary processing unit, a FPGA, or the like.

The method 900 begins and sends 905 a first provisioning request message to a first mobile communication network. The method 900 includes receiving 910 a provisioning response message from the first mobile communication network. Here, the first provisioning request message contains an identity of a second mobile communication network and the provisioning response message contains an authorization token associated with the first service. The method 900 includes sending 915 a second provisioning request message to a UE having a first subscription with the first mobile communication network. Here, the second provisioning request message contains a second subscription that enables the UE to register with the second mobile communication network, where the second mobile communication network is not accessible with the first subscription. The method 900 includes receiving 920 a second provisioning response message from the UE, where the second provisioning response indicates that the UE successfully validated the second subscription. The method 900 ends.

FIG. 10 depicts one embodiment of a method 1000 for provisioning a subscription to access local services, according to embodiments of the disclosure. In various embodiments, the method 1000 is performed by a UE, such as the remote unit 105, the UE 205, and/or the user equipment apparatus 500, described above. In some embodiments, the method 1000 is performed by a processor, such as a microcontroller, a microprocessor, a CPU, a GPU, an auxiliary processing unit, a FPGA, or the like.

The method 1000 begins and registers 1005 with a first mobile communication network using a first subscription. The method 1000 includes connecting 1010 to a remote server accessible via the first mobile communication network. The method 1000 includes receiving 1015 a second subscription from the first mobile communication network, where the second subscription enables the UE to register with a second mobile communication network. Here, the second mobile communication network is not accessible with the first subscription. The method 1000 includes registering 1020 with the second mobile communication network using the second subscription. The method 1000 includes connecting 1025 to a local server accessible via the second mobile communication network, said local server providing a same service as the remote server. Here, the local server is not accessible via the first mobile communication network. The method 1000 ends.

FIG. 11 depicts one embodiment of a method 1100 for provisioning a subscription to access local services, according to embodiments of the disclosure. In various embodiments, the method 1100 is performed by a HPLMN NF, such as the provisioning server 126, the HPLMN 215, and/or the network equipment apparatus 600, described above. In some embodiments, the method 1100 is performed by a processor, such as a microcontroller, a microprocessor, a CPU, a GPU, an auxiliary processing unit, a FPGA, or the like.

The method 1100 begins and sends 1105 a first provisioning request message from an application function associated with a first service. Here, the first provisioning request message contains a second subscription that enables a UE having a first subscription with the first mobile communication network to register with a second mobile communication network, where the second mobile communication network is not accessible with the first subscription.

The method 1100 includes receiving 1110 an indication that the UE has initiated communication with a remote server accessible via the first mobile communication network, where the remote server provides the first service. The method 1100 includes sending 1115 a second provisioning request message to the UE in response to the indication. Here, the second provisioning request message contains the second subscription and enables the UE to access a local server via the second mobile communication network, where the local server provides the first service and is not accessible via the first mobile communication network. The method 1100 ends.

Disclosed herein is a first apparatus for provisioning a subscription to access local services, according to embodiments of the disclosure. The first apparatus may be implemented by a UE, such as the remote unit 105, the UE 205, and/or the user equipment apparatus 500. The first apparatus includes a transceiver that communicates a first mobile communication network and a processor that registers with the first mobile communication network using a first subscription (e.g., stored in USIM) and connects to a remote server accessible via the first mobile communication network. Via the transceiver, the processor receives a second subscription from the remote server, where the second subscription enables the UE to register with a second mobile communication network (e.g., a PLMN). Here, the second mobile communication network is not accessible with the first subscription. The processor stores the second subscription (e.g., in the USIM) in response to receiving authorization from the first mobile communication network and registers with the second mobile communication network using the second subscription. Via the transceiver, the processor connects to a local server accessible via the second mobile communication network, said local server providing a same service as the remote server. Here, the local server is not accessible via the first mobile communication network.

In some embodiments, the processor registers with the second mobile communication network occurs in response to moving to a location area where the second subscription is valid. In some embodiments, the second subscription is received via a first UE application. In such embodiments, receiving authorization from the first mobile communication network includes verifying that the first UE application is signed by a certificate stored in a subscriber identity module (e.g., USIM) of the UE.

In some embodiments, receiving authorization from the first mobile communication network includes: 1) sending a subscription request message to the first mobile communication network and 2) receiving a subscription accept message from the first mobile communication network. Here, the subscription accept message authorizes the UE to use the second subscription. In certain embodiments, the processor receives an authorization token from the remote server and includes the authorization token in the subscription request message. Here, the subscription accept message is provided after validating the authorization token.

In some embodiments, the second subscription is received in a subscription provisioning request message. In such embodiments, the processor may generate a subscription identity in response to successfully storing the second subscription and send a subscription provisioning response message to the remote server, where the subscription provisioning response message contains the generated subscription identity. Here, the subscription provisioning response indicates whether the second subscription is successfully stored in the UE. In certain embodiments, the processor further generates.

In some embodiments, registering with the second mobile communication network includes executing an authentication procedure between the UE and an authentication server accessible via the second mobile communication network. In such embodiments, the authentication procedure uses a credential contained in the second subscription.

In some embodiments, connecting to the local server accessible via the second mobile communication network includes establishing a PDU session with the second mobile communication network using PDU session parameters contained in the second subscription. In some embodiments, the second subscription contains one or more of: an identity of the second mobile communication network, at least one location area where the second subscription is valid, a credential needed to register with the second mobile communication network, PDU session parameters, and/or an authorization token provided by the first mobile communication network.

Disclosed herein is a first method for provisioning a subscription to access local services, according to embodiments of the disclosure. The first method may be performed by a UE, such as the remote unit 105, the UE 205, and/or the user equipment apparatus 500. The first method includes registering with a first mobile communication network using a first subscription (e.g., stored in USIM) and connecting to a remote server accessible via the first mobile communication network. The first method includes receiving a second subscription from the remote server, where the second subscription enables the UE to register with a second mobile communication network (e.g., a PLMN). Here, the second mobile communication network is not accessible with the first subscription. The first method includes storing the second subscription (e.g., in the USIM) in response to receiving authorization from the first mobile communication network and registering with the second mobile communication network using the second subscription. The first method includes connecting to a local server accessible via the second mobile communication network, said local server providing a same service as the remote server. Here, the local server is not accessible via the first mobile communication network.

In some embodiments, the first method includes moving to a location area where the second subscription is valid. In such embodiments, registering with the second mobile communication network occurs in response to moving to the location area where the second subscription is valid. In some embodiments, the second subscription is received via a first UE application. In such embodiments, receiving authorization from the first mobile communication network includes verifying that the first UE application is signed by a certificate stored in a subscriber identity module (e.g., USIM) of the UE.

In some embodiments, receiving authorization from the first mobile communication network includes: 1) sending a subscription request message to the first mobile communication network and 2) receiving a subscription accept message from the first mobile communication network. Here, the subscription accept message authorizes the UE to use the second subscription. In certain embodiments, the first method further includes: 1) receiving an authorization token from the remote server and 2) including the authorization token in the subscription request message. Here, the subscription accept message is provided after validating the authorization token.

In some embodiments, the second subscription is received in a subscription provisioning request message. In such embodiments, the first method further includes generating a subscription identity in response to successfully storing the second subscription and sending a subscription provisioning response message to the remote server, where the subscription provisioning response message contains the generated subscription identity. Here, the subscription provisioning response indicates whether the second subscription is successfully stored in the UE. In certain embodiments, the first method further includes.

In some embodiments, registering with the second mobile communication network includes executing an authentication procedure between the UE and an authentication server accessible via the second mobile communication network. In such embodiments, the authentication procedure uses a credential contained in the second subscription.

In some embodiments, connecting to the local server accessible via the second mobile communication network includes establishing a PDU session with the second mobile communication network using PDU session parameters contained in the second subscription. In some embodiments, the second subscription contains one or more of: an identity of the second mobile communication network, at least one location area where the second subscription is valid, a credential needed to register with the second mobile communication network, PDU session parameters, and/or an authorization token provided by the first mobile communication network.

Disclosed herein is a second apparatus for provisioning a subscription to access local services, according to embodiments of the disclosure. The second apparatus may be implemented by a provisioning function in a HPLMN, such as the provisioning server 126, the HPLMN 215, and/or the network equipment apparatus 600. The second apparatus includes a network interface that receives a provisioning request message from an application function associated with a first service, where the provisioning request message contains a second subscription that enables a UE having a first subscription with a first mobile communication network (i.e., the HPLMN) to register with a second mobile communication network. Here, the second mobile communication network is not accessible with the first subscription. The second apparatus includes a processor that sends a provisioning response message to the application function, where the provisioning response message contains an indication that the second subscription is accepted.

The processor receives a subscription request message from the UE, the subscription request message containing a request to apply the second subscription. Via the network interface, the processor sends a subscription accept message to the UE in response to validating the subscription request, where the subscription accept message authorizes the UE to apply the second subscription and enables the UE to access a local server via the second mobile communication network. Here, the local server provides the first service and is not accessible via the first mobile communication network.

In some embodiments, the indication contained in the provisioning response message includes an authorization token. Note that the authorization token is a token generated by the HPLMN to identify the second subscription. In such embodiments, the subscription request message may contain the authorization token, where the subscription accept message is sent to the UE in response to validating the authorization token.

In some embodiments, the subscription request includes a UE identity and a subscription identity generated by the UE and associated with the second subscription. In such embodiments, the processor stores the UE identity and the subscription identity. In some embodiments, the processor sends a request to the UE via the network interface, where the request instructs the UE to delete the second subscription.

Disclosed herein is a second method for provisioning a subscription to access local services, according to embodiments of the disclosure. The second method may be performed by a provisioning function in a HPLMN, such as the provisioning server 126, the HPLMN 215, and/or the network equipment apparatus 600. The second method includes receiving a provisioning request message from an application function associated with a first service, where the provisioning request message contains a second subscription that enables a UE having a first subscription with a first mobile communication network (i.e., the HPLMN) to register with a second mobile communication network. Here, the second mobile communication network is not accessible with the first subscription. The second method includes sending a provisioning response message to the application function, where the provisioning response message contains an indication that the second subscription is accepted.

The second method includes receiving a subscription request message from the UE, the subscription request message containing a request to apply the second subscription. The second method includes sending a subscription accept message to the UE in response to validating the subscription request, where the subscription accept message authorizes the UE to apply the second subscription and enables the UE to access a local server via the second mobile communication network. Here, the local server provides the first service and is not accessible via the mobile communication network.

In some embodiments, the indication contained in the provisioning response message includes an authorization token. Note that the authorization token is a token generated by the HPLMN to identify the second subscription. In such embodiments, the subscription request message may contain the authorization token, where the subscription accept message is sent to the UE in response to validating the authorization token.

In some embodiments, the subscription request includes a UE identity and a subscription identity generated by the UE and associated with the second subscription. In such embodiments, the method further includes storing the UE identity and the subscription identity. In some embodiments, the second method includes sending a request to the UE, where the request instructs the UE to delete the second subscription.

Disclosed herein is a third apparatus for provisioning a subscription to access local services, according to embodiments of the disclosure. The third apparatus may be implemented by an application function and/or remote server that provides a first service, such as the AF 151, the remote server 153, the AF 230, the Remote Service Instance 235, and/or the network equipment apparatus 600. The third apparatus includes a processor that sends a first provisioning request message to a first mobile communication network. The third apparatus includes a network interface that receives a provisioning response message from the first mobile communication network. Here, the first provisioning request message contains an identity of a second mobile communication network and the provisioning response message contains an authorization token associated with the first service. The processor sends a second provisioning request message to a UE having a first subscription with the first mobile communication network. Here, the second provisioning request message contains a second subscription that enables the UE to register with the second mobile communication network, where the second mobile communication network is not accessible with the first subscription. Via the network interface, the processor receives a second provisioning response message from the UE, where the second provisioning response indicates that the UE successfully validated the second subscription.

In some embodiments, the second provisioning response message comprises a subscription identity generated by the UE and associated with the first service. In such embodiments, the processor stores a UE identity and the subscription identity. In some embodiments, the first provisioning request message contains a client application identity. In such embodiments, the second provisioning request message is sent to a client application of the UE that matches the client application identity, where the second provisioning response message is received from the matching client application of the UE.

Disclosed herein is a third method for provisioning a subscription to access local services, according to embodiments of the disclosure. The third method may be performed by an application function and/or remote server that provides a first service, such as the AF 151, the remote server 153, the AF 230, the Remote Service Instance 235, and/or the network equipment apparatus 600. The third method includes sending a first provisioning request message to a first mobile communication network. The third method includes receiving a provisioning response message from the first mobile communication network. Here, the first provisioning request message contains an identity of a second mobile communication network and the provisioning response message contains an authorization token associated with the first service. The third method includes sending a second provisioning request message to a UE having a first subscription with the first mobile communication network. Here, the second provisioning request message contains a second subscription that enables the UE to register with the second mobile communication network, where the second mobile communication network is not accessible with the first subscription. The third method includes receiving a second provisioning response message from the UE, where the second provisioning response indicates that the UE successfully validated the second subscription.

In some embodiments, the second provisioning response message comprises a subscription identity generated by the UE and associated with the first service. In such embodiments, the third method may include storing a UE identity and the subscription identity. In some embodiments, the first provisioning request message contains a client application identity. In such embodiments, the second provisioning request message is sent to a client application of the UE that matches the client application identity, where the second provisioning response message is received from the matching client application of the UE.

Disclosed herein is a fourth apparatus for provisioning a subscription to access local services, according to embodiments of the disclosure. The fourth apparatus may be implemented by a UE, such as the remote unit 105, the UE 205, and/or the user equipment apparatus 500. The fourth apparatus includes a transceiver that communicates a first mobile communication network and a processor that registers with a first mobile communication network using a first subscription (e.g., in USIM) and connects to a remote server accessible via the first mobile communication network. Via the transceiver, the processor receives a second subscription from the first mobile communication network, where the second subscription enables the UE to register with a second mobile communication network (e.g., a PLMN). Here, the second mobile communication network is not accessible with the first subscription. The processor registers with the second mobile communication network using the second subscription. Via the transceiver, the processor connects to a local server accessible via the second mobile communication network, said local server providing a same service as the remote server. Here, the local server is not accessible via the first mobile communication network.

In some embodiments, the processor registers with the second mobile communication network occurs in response to moving to the location area where the second subscription is valid. In some embodiments, registering with the second mobile communication network includes executing an authentication procedure between the UE and an authentication server accessible via the second mobile communication network. Here, the authentication procedure uses a credential contained in the second subscription.

In some embodiments, the second subscription is received with a subscription provisioning request message. In such embodiments, the processor generates a subscription identity in response to receiving the subscription provisioning request message and sends a subscription provisioning response message, where the subscription provisioning response message contains the generated subscription identity. Additionally, the processor may store the second subscription (e.g., in the USIM).

In some embodiments, connecting to the local server accessible via the second mobile communication network comprises establishing a PDU session with the second mobile communication network using PDU session parameters contained in the second subscription. In some embodiments, the second subscription contains one or more of: an identity of a UE application associated with the remote service, an identity of the second mobile communication network, at least one location area where the second subscription is valid, a credential needed to register with the second mobile communication network, and PDU session parameters.

Disclosed herein is a fourth method for provisioning a subscription to access local services, according to embodiments of the disclosure. The fourth method may be performed by a UE, such as the remote unit 105, the UE 205, and/or the user equipment apparatus 500. The fourth method includes registering with a first mobile communication network using a first subscription (e.g., in USIM) and connecting to a remote server accessible via the first mobile communication network. The fourth method includes receiving a second subscription from the first mobile communication network, where the second subscription enables the UE to register with a second mobile communication network (e.g., a PLMN). Here, the second mobile communication network is not accessible with the first subscription. The fourth method includes registering with the second mobile communication network using the second subscription. The fourth method includes connecting to a local server accessible via the second mobile communication network, said local server providing a same service as the remote server. Here, the local server is not accessible via the first mobile communication network.

In some embodiments, the fourth method includes moving to a location area where the second subscription is valid. In such embodiments, registering with the second mobile communication network occurs in response to moving to the location area where the second subscription is valid. In some embodiments, registering with the second mobile communication network includes executing an authentication procedure between the UE and an authentication server accessible via the second mobile communication network. Here, the authentication procedure uses a credential contained in the second subscription.

In some embodiments, the second subscription is received with a subscription provisioning request message. In such embodiments, the first method further includes: 1) generating a subscription identity in response to receiving the subscription provisioning request message; 2) sending a subscription provisioning response message; and 3) storing the second subscription (e.g., in the USIM). Here, the subscription provisioning response message contains the generated subscription identity.

In some embodiments, connecting to the local server accessible via the second mobile communication network comprises establishing a PDU session with the second mobile communication network using PDU session parameters contained in the second subscription. In some embodiments, the second subscription contains one or more of: an identity of a UE application associated with the remote service, an identity of the second mobile communication network, at least one location area where the second subscription is valid, a credential needed to register with the second mobile communication network, and PDU session parameters.

Disclosed herein is a fifth apparatus for provisioning a subscription to access local services, according to embodiments of the disclosure. The fifth apparatus may be implemented by a provisioning function in a HPLMN, such as the provisioning server 126, the HPLMN 215, and/or the network equipment apparatus 600. The fifth apparatus includes a network interface that receives a first provisioning request message from an application function associated with a first service, the first provisioning request message containing a second subscription that enables a UE having a first subscription with a first mobile communication network (i.e., the HPLMN) to register with a second mobile communication network. Here, the second mobile communication network is not accessible via the first subscription. The fifth apparatus includes a processor that receives an indication that the UE has initiated communication with a remote server accessible via the first mobile communication network, where the remote server provides the first service. Via the network interface and in response to the indication, the processor sends a second provisioning request message to the UE, where the second provisioning request message contains the second subscription and enables the UE to access a local server via the second mobile communication network, where the local server provides the first service and is not accessible via the first mobile communication network.

In some embodiments, the processor receives a provisioning response message from the UE, where the provisioning response includes a subscription identity generated by the UE and associated with the second subscription. In such embodiments, the processor stores a UE identity and the subscription identity. In some embodiments, the processor sends a request to the UE, the request instructing the UE to delete the second subscription.

Disclosed herein is a fifth method for provisioning a subscription to access local services, according to embodiments of the disclosure. The fifth method may be performed by a provisioning function in a HPLMN, such as the provisioning server 126, the HPLMN 215, and/or the network equipment apparatus 600. The fifth method includes receiving a first provisioning request message from an application function associated with a first service, the first provisioning request message containing a second subscription that enables a UE having a first subscription with a first mobile communication network (i.e., the HPLMN) to register with a second mobile communication network. Here, the second mobile communication network is not accessible with the first subscription. The fifth method includes receiving an indication that the UE has initiated communication with a remote server accessible via the first mobile communication network, where the remote server provides the first service. The fifth method includes sending a second provisioning request message to the UE in response to the indication, where the second provisioning request message contains the second subscription and enables the UE to access a local server via the second mobile communication network, where the local server provides the first service and is not accessible via the first mobile communication network.

In some embodiments, the fifth method includes receiving a provisioning response message from the UE, where the provisioning response includes a subscription identity generated by the UE and associated with the second subscription. In such embodiments, the fifth method includes storing a UE identity and the subscription identity. In some embodiments, the fifth method includes sending a request to the UE, the request instructing the UE to delete the second subscription.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of a user equipment ("UE"), the method comprising:

registering with a first mobile communication network using a first subscription;

connecting to a remote server accessible via the first mobile communication network;

receiving a second subscription and an authorization token from the remote server, wherein the second subscription enables the UE to register with a second mobile communication network, wherein the second mobile communication network is not accessible with the first subscription;

storing the second subscription in response to receiving authorization from the first mobile communication network, wherein receiving authorization from the first mobile communication network comprises sending a subscription request message including the authorization token to the first mobile communication network and receiving a subscription accept message after validation of the authorization token;

registering with the second mobile communication network using the second subscription; and connecting to a local server accessible via the second mobile communication network, said local server providing a same service as the remote server, wherein the local server is not accessible via the first mobile communication network.

2. The method of claim 1, further comprising moving to a location area where the second subscription is valid, wherein registering with the second mobile communication network occurs in response to moving to the location area where the second subscription is valid.

3. The method of claim 1, wherein the second subscription is received via a first UE application, wherein receiving authorization from the first mobile communication network comprises verifying that the first UE application is signed by a certificate stored in a subscriber identity module of the UE.

4. The method of claim 1, wherein the subscription accept message authorizes the UE to use the second subscription.

5. The method of claim 1, wherein the second subscription is received in a subscription provisioning request message, the method further comprising:

generating a subscription identity in response to successfully storing the second subscription; and sending a subscription provisioning response message to the remote server, the subscription provisioning response message containing the generated subscription identity, wherein the subscription provisioning response indicates whether the second subscription is successfully stored in the UE.

6. The method of claim 1, wherein registering with the second mobile communication network comprises executing an authentication procedure between the UE and an authentication server accessible via the second mobile communication network, wherein the authentication procedure uses a credential contained in the second subscription.

7. The method of claim 1, wherein connecting to the local server accessible via the second mobile communication network comprises establishing a PDU session with the second mobile communication network using PDU session parameters contained in the second subscription.

8. The method of claim 1, wherein the second subscription contains one or more of:

an identity of the second mobile communication network, at least one location area where the second subscription is valid, a credential needed to register with the second mobile communication network, PDU session parameters, and an authorization token provided by the first mobile communication network.

9. A method of a provisioning function in a first mobile communication network, the method comprising:

receiving a provisioning request message from an application function associated with a first service, the provisioning request message containing a second subscription, wherein the second subscription enables a user equipment ("UE") having a first subscription with the first mobile communication network to register with a second mobile communication network, wherein the second mobile communication network is not accessible with the first subscription;

sending a provisioning response message to the application function, the provisioning response message containing an indication that the second subscription is accepted, the indication comprising an authorization token;

receiving a subscription request message from the UE, the subscription request message containing comprising the authorization token and a request to apply the second subscription; and sending a subscription accept message to the UE in response to validating the authorization token from the subscription request message, wherein the subscription accept message authorizes the UE to apply the second subscription and enables the UE to access a local server via the second mobile communication network, wherein the local server provides the first service and is not accessible via the first mobile communication network.

10. The method of claim 9, wherein the subscription request message comprises a UE identity and a subscription identity generated by the UE and associated with the second subscription, the method further comprising storing the UE identity and the subscription identity.

11. The method of claim 9, further comprising sending a request to the UE, the request instructing the UE to delete the second subscription.

12. A method of a user equipment ("UE"), the method comprising:

registering with a first mobile communication network using a first subscription;

connecting to a remote server accessible via the first mobile communication network;

receiving a second subscription and an authorization token from the first mobile communication network, wherein the second subscription enables the UE to register with a second mobile communication network, wherein the second mobile communication network is not accessible with the first subscription;

sending a subscription request message including the authorization token to the first mobile communication network;

receiving a subscription accept message in response to the first mobile communication network validating the authorization token;

registering with the second mobile communication network using the second subscription; and connecting to a local server accessible via the second mobile communication network, said local server providing a same service as the remote server, wherein the local server is not accessible via the first mobile communication network.

13. The method of claim 12, further comprising moving to a location area where the second subscription is valid, wherein registering with the second mobile communication network occurs in response to moving to the location area where the second subscription is valid.

14. The method of claim 12, wherein the second subscription is received with a subscription provisioning request message, the method further comprising:

generating a subscription identity in response to receiving the subscription provisioning request message;

sending a subscription provisioning response message, wherein the subscription provisioning response message contains the generated subscription identity; and storing the second subscription.

15. The method of claim 12, wherein registering with the second mobile communication network comprises executing an authentication procedure between the UE and an authentication server accessible via the second mobile communication network, wherein the authentication procedure uses a credential contained in the second subscription.

16. The method of claim 14, wherein connecting to the local server accessible via the second mobile communication network comprises establishing a PDU session with the second mobile communication network using PDU session parameters contained in the second subscription.

17. The method of claim 12, wherein the second subscription contains one or more of:

an identity of a UE application associated with the remote-service, an identity of the second mobile communication network, at least one location area where the second subscription is valid, a credential needed to register with the second mobile communication network, and PDU session parameters.

18. A method of a provisioning function in a first mobile communication network, the method comprising:

receiving a first provisioning request message from an application function associated with a first service, the first provisioning request message containing a second subscription, wherein the second subscription enables a user equipment ("UE") having a first subscription with the first mobile communication network to register with a second mobile communication network, wherein the second mobile communication network is not accessible with the first subscription;

receiving an indication that the UE has initiated communication with a remote server accessible via the first mobile communication network, wherein the remote server provides the first service and an authorization token;

validating the authorization token; and sending a second provisioning request message to the UE, in response to the indication validating the authorization token, wherein the second provisioning request message contains the second subscription and enables the UE to access a local server via the second mobile communication network, wherein the local server provides the first service and is not accessible via the first mobile communication network.

\* \* \* \* \*